United States Patent
Taya

(10) Patent No.: US 8,597,094 B2
(45) Date of Patent: Dec. 3, 2013

(54) GAME MACHINE, CONTROLLING METHOD, PROGRAM AND INFORMATION STORAGE MEDIUM OF THE GAME MACHINE FOR IMPROVING OPERABILITY FOR A USER WHEN A PLAYER CHARACTER OF AN OPPONENT TEAM HOLDS A MOVING OBJECT

(75) Inventor: Junichi Taya, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 238 days.

(21) Appl. No.: 12/740,911

(22) PCT Filed: Jul. 9, 2008

(86) PCT No.: PCT/JP2008/062379
§ 371 (c)(1),
(2), (4) Date: Apr. 30, 2010

(87) PCT Pub. No.: WO2009/057354
PCT Pub. Date: May 7, 2009

(65) Prior Publication Data
US 2010/0267435 A1    Oct. 21, 2010

(30) Foreign Application Priority Data
Nov. 2, 2007   (JP) .................................. 2007-286494

(51) Int. Cl.
*A63F 9/24*      (2006.01)
(52) U.S. Cl.
USPC ............................ 463/4; 463/1; 463/7; 463/9
(58) Field of Classification Search
USPC .......................................................... 463/4
See application file for complete search history.

(56) References Cited

U.S. PATENT DOCUMENTS 6,149,520 A * 11/2000 Takatsuka ......................... 463/4
6,155,924 A * 12/2000 Nakagawa et al. ............... 463/4
(Continued)

FOREIGN PATENT DOCUMENTS

EP    0836871 A2    4/1998
EP    1052000 A2    11/2000
(Continued)

OTHER PUBLICATIONS

European Search Report corresponding to European Patent Application No. 08777988.0, dated Nov. 25, 2010.
(Continued)

*Primary Examiner* — Ronald Laneau
*Assistant Examiner* — Justin Myhr
(74) *Attorney, Agent, or Firm* — Sughrue Mion, PLLC

(57) ABSTRACT

To provide a game device capable of improving operability for a user when a player character of an opponent team holds a moving object in a sport game to be played by a user team and the opponent team. A first marker control unit (72*d*) controls the position of a marker player character selected from among the player characters of the user team, based on the position of a marking target player character selected from among the player characters of the opponent team and a predetermined position. A second marker control unit (72*e*) controls the position of the marker player character, based on the position of the marking target player character and the position of a moving object or the position of a player character holding the moving object. The marker control switching unit (72*g*) switches between the first marker control unit (72*d*) and the second marker control unit (72*e*), based on a result of determination as to whether or not a predetermined switching condition is satisfied.

15 Claims, 14 Drawing Sheets

(56) References Cited

U.S. PATENT DOCUMENTS

| | | | |
|---|---|---|---|
| 6,280,323 B1 * | 8/2001 | Yamazaki et al. | 463/4 |
| 6,347,993 B1 | 2/2002 | Kondo et al. | |
| 2003/0144045 A1 | 7/2003 | Fujita | |
| 2005/0037826 A1 * | 2/2005 | Rupert et al. | 463/4 |
| 2005/0176486 A1 | 8/2005 | Nishimura et al. | |
| 2010/0004041 A1 * | 1/2010 | Shindo | 463/4 |

FOREIGN PATENT DOCUMENTS

| | | |
|---|---|---|
| JP | 10-290886 A | 11/1998 |
| JP | 10-333834 A | 12/1998 |
| JP | 2000-317138 A | 11/2000 |
| JP | 2001-232066 A | 8/2001 |
| JP | 2004-329531 A | 11/2004 |
| JP | 2005-131310 A | 5/2005 |
| JP | 2005-218779 A | 8/2005 |
| JP | 2007-259988 A | 10/2007 |
| JP | 10-113471 A | 5/2010 |

OTHER PUBLICATIONS

Japanese Office Action dated Jun. 4, 2011, issued in Japanese Patent Application No. 2007-286494 with partial translation.

* cited by examiner

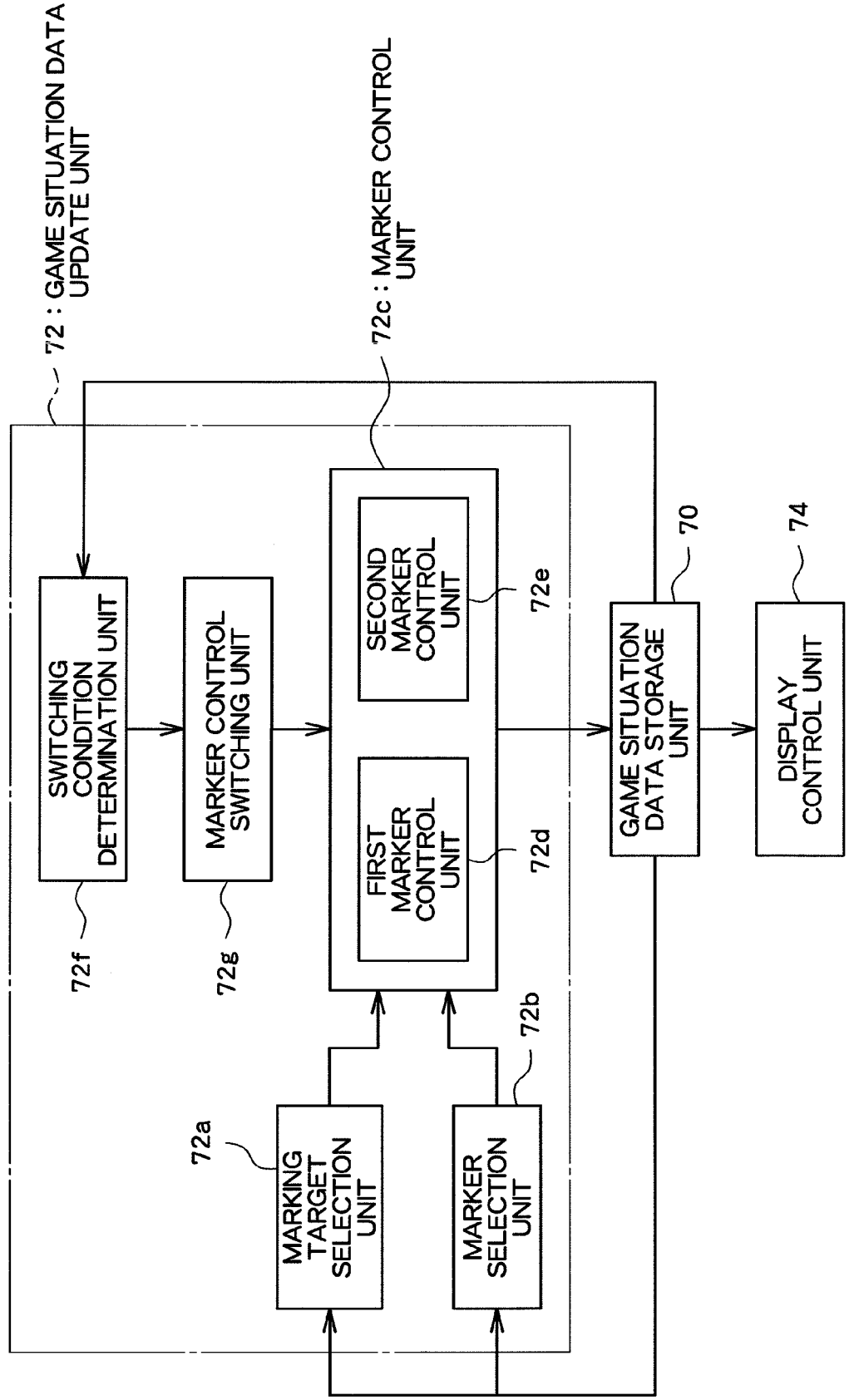

FIG.10

| MATCH TIME | | ------ |
|---|---|---|
| SCORE | | ------ |
| FIRST USER CURSOR POSITION | | ------ |
| SECOND USER CURSOR POSITION | | ------ |
| VIRTUAL CAMERA | POSITION | ------ |
| | POSTURE (VIEWING DIRECTION) | ------ |
| | ... | ... |
| BALL OBJECT | POSITION | ------ |
| | MOVEMENT DIRECTION AND SPEED | ------ |
| | ... | ... |
| PLAYER OBJECT (A01) | POSITION | ------ |
| | POSTURE | ------ |
| | MOVEMENT DIRECTION AND SPEED | ------ |
| | INSTRUCTION TARGET FLAG | ------ |
| | BALL HOLDING FLAG | ------ |
| | MARKER FLAG | ------ |
| | MARKING TARGET PLAYER ID | ------ |
| | MARKER ACTION MODE FLAG | ------ |
| | ... | ... |
| PLAYER OBJECT (A02) | ... | ... |
| ... | ... | ... |
| PLAYER OBJECT (A11) | ... | ... |
| PLAYER OBJECT (B01) | ... | ... |
| ... | ... | ... |
| PLAYER OBJECT (B11) | ... | ... |

GAME MACHINE, CONTROLLING METHOD, PROGRAM AND INFORMATION STORAGE MEDIUM OF THE GAME MACHINE FOR IMPROVING OPERABILITY FOR A USER WHEN A PLAYER CHARACTER OF AN OPPONENT TEAM HOLDS A MOVING OBJECT

TECHNICAL FIELD

The present invention relates to a game device, a game device control method, a program, and an information storage medium.

BACKGROUND ART

There is known a sport game to be played by a user team and an opponent team. For example, there is known a soccer game, a basket ball game, an ice hockey game, or the like.
Patent Document 1: JP 2007-259988 A

DISCLOSURE OF THE INVENTION

Problems to be Solved by the Invention

In the above described sport game, when a player character of the opponent team holds a moving object, a user needs to perform defensive operations, while paying attention to the player character holding the moving object and a player character who is highly likely to receive a pass from the player character. However, such an operation may be difficult to achieve for some users (particularly for a user of a low training level).

The present invention has been conceived in view of the above, and aims to provide a game device, a game device control method, a program, and an information storage medium capable of improving, in a sport game to be played by a user team and an opponent team, operability for a user when a player character of the opponent team holds a moving object.

Means to Solve the Problems

In order to attain the above described object, a game device according to the present invention is a game device for carrying out a sport game to be played by a user team and an opponent team, comprising player character state storage means for storing positions of player characters belonging to the user team and positions of player characters belonging to the opponent team; marking target selection means for selecting any of the player characters belonging to the opponent team as a marking target player character; marker selection means for selecting any of the player characters belonging to the user team as a marker player character; first marker control means for controlling a position of the marker player character, based on a position of the marking target player character and a predetermined position; second marker control means for controlling the position of the marker player character, based on the position of the marking target player character and a position of a moving object or a position of a player character holding the moving object among the player characters belonging to the opponent team; determination means for determining whether or not a predetermined switching condition is satisfied; and marker control switching means for switching a state in which the first marker control means controls the position of the marker player character and a state in which the second marker control means controls the position of the marker player character, based on a result of determination by the determination means.

Also, a game device control method according to the present invention is a game device control method for controlling a game device for carrying out a sport game to be played by a user team and an opponent team, the method comprising a step of reading content stored in player character state storage means for storing positions of player characters belonging to the user team and positions of player characters belonging to the opponent team; a marking target selection step of selecting any of the player characters belonging to the opponent team as a marking target player character; a marker selection step of selecting any of the player characters belonging to the user team as a marker player character; a first marker control step of controlling a position of the marker player character, based on a position of the marking target player character and a predetermined position; a second marker control step of controlling the position of the marker player character, based on the position of the marking target player character and a position of a moving object or a position of a player character holding the moving object among the player characters belonging to the opponent team; a determination step of determining whether or not a predetermined switching condition is satisfied; and a marker control switching step of switching a state in which the position of the marker player character is controlled at the first marker control step and a state in which the position of the marker player character is controlled at the second marker control step, based on a result of determination at the determination step.

Also, a program according to the present invention is a program for causing a computer, such as a consumer game device (an installation type game device), a portable game device, a commercial game device, a portable phone, a personal digital assistant (PDA), a personal computer, or the like, to function as a game device for carrying out a sport game to be played by a user team and an opponent team, the program causing the computer to function as player character state storage means for storing positions of player characters belonging to the user team and positions of player characters belonging to the opponent team; marking target selection means for selecting any of the player characters belonging to the opponent team as a marking target player character; marker selection means for selecting any of the player characters belonging to the user team as a marker player character; first marker control means for controlling a position of the marker player character, based on a position of the marking target player character and a predetermined position; second marker control means for controlling the position of the marker player character, based on the position of the marking target player character and a position of a moving object or a position of a player character holding the moving object among the player characters belonging to the opponent team; determination means for determining whether or not a predetermined switching condition is satisfied; and marker control switching means for switching a state in which the first marker control means controls the position of the marker player character and a state in which the second marker control means controls the position of the marker player character, based on a result of determination by the determination means.

Also, an information storage medium according to the present invention is a computer readable information storage medium storing the above described program. Also, a program distribution device according to the present invention has an information storage medium recording the above described program, and reads the above described program from the information storage medium and distributes. Also, a program distribution method according to the present invention is a program distribution method for reading the above described program for an information storage medium storing the above described program and distributing the program.

The present invention relates to a game device for carrying out a sport game to be played by a user team and an opponent team. According to the present invention, the positions of player characters belonging to the user team and the positions of player characters belonging to the opponent team are stored. Any of the player characters belonging to the opponent team can be selected as a marking target player character. Any of the player characters belonging to the user team can be selected as a marker player character. First marker control means controls the position of the marker player character, based on the position of the marking target player character and a predetermined position. Second marker control means controls the position of the marker player character, based on the position of the marking target player character and the position of a moving object or the position of a player character holding the moving object among the player characters belonging to the opponent team. Whether or not a predetermined switching condition is satisfied is determined. A state in which the first marker control means controls the position of the marker player character and a state in which the second marker control means controls the position of the marker player character is switched based on a result of determination. According to the present invention, operability for a user when a player object of the opponent team holds the moving object can be enhanced.

According to one aspect of the present invention, the player character state storage means may store a representative direction of the player character belonging to the opponent team, the switching condition may include a condition for determining whether or not an angle between the representative direction of the player character holding the moving object, among the player characters belonging to the opponent team, and the direction from the position of the player character holding the moving object, among the player characters belonging to the opponent team, to the position of the marking target player character, is equal to or smaller than a predetermined reference angle, and the marker control switching means may include means for, in a case where the angle is equal to or smaller than the predetermined reference angle, switching from a state in which the first marker control means controls the position of the marker player character to a state in which the second marker control means controls the position of the marker player character.

According to one aspect of the present invention, the opponent team may be operated by an opponent user, the game device may further comprise means for displaying a cursor which moves in a game screen image according to an operation by the opponent user, and means for, in a case where the opponent user carries out a predetermine pass instruction operation, causing the player character holding the moving object, among the player characters belonging to the opponent team, to make a pass toward a position of the cursor, and the switching condition may include a condition concerning the position of the cursor and the position of the marking target player character.

According to one aspect of the present invention, the switching condition may include a condition for determining whether or not an angle between the direction from the position of the moving object or the position of the player character holding the moving object, among the player characters belonging to the opponent team, to the position of the cursor, and the direction from the position of the moving object or the position of the player character holding the moving object, among the player characters belonging to the opponent team, to the position of the marking target player character, is equal to or smaller than a predetermined reference angle, and the marker control switching means may include means for, in a case where the angle is equal to or smaller than the predetermined reference angle, switching from the state in which the first marker control means controls the position of the marker player character to the state in which the second marker control means controls the position of the marker player character.

According to one aspect of the present invention, the switching condition may include a condition for determining whether or not a distance between the position of the cursor and the position of the marking target player character is equal to or shorter than a predetermined reference distance, and the marker control switching means may include means for, in a case where the distance is equal to or shorter than the predetermined reference distance, switching from the state in which the first marker control means controls the position of the marker player character to the state in which the second marker control means controls the position of the marker player character.

According to one aspect of the present invention, the switching condition may be a condition for determining whether or not a player character other than the marker player character, among the player characters belonging to the user team, is located within an area specified based on the position of the marking target player character and the predetermined position, and the marker control switching means may include means for, in a case where the player character other than the marker player character, among the player characters belonging to the user team, is located within the area, switching from a state in which the first marker control means controls the position of the marker player character to a state in which the second marker control means controls the position of the marker player character.

According to one aspect of the present invention, the switching condition may be a condition for determining whether or not a player character other than the marker player character, among the player characters belonging to the user team, is located within an area specified based on the position of the marker player character and the predetermined position, and the marker control switching means may include means for, in a case where the player character other than the marker player character, among the player characters belonging to the user team, is located within the area, switching from a state in which the first marker control means controls the position of the marker player character to a state in which the second marker control means controls the position of the marker player character.

According to one aspect of the present invention, the determination means may determine whether or not a predetermined switching instruction operation is carried out, the marker control switching means, in a case where the predetermined switching instruction operation is carried out, may switch the state in which the first marker control means controls the position of the marker player character to the state in which the second marker control means controls the position of the marker player character, and the game device may further comprise second determination means for determining whether or not a condition concerning at least one of the position of the marker player character and the position of the marking target player character is satisfied, and means for displaying a predetermined image in the game screen image, based on a result of determination by the second determination means.

BRIEF DESCRIPTION OF THE DRAWINGS

FIG. 9 is a functional block diagram of a game device according to this embodiment;

FIG. 10 is a diagram showing one example of game situation data;

BEST MODE FOR CARRYING OUT THE INVENTION

In the following, an example of an embodiment of the present invention will be described in detail based on the accompanying drawings. A game device according to an embodiment of the present invention is realized using, e.g., a consumer game device (an installation type game device), a portable game device, a portable phone, a personal digital assistant (PDA), a personal computer, or the like. Here, a case in which a consumer game device is used to realize a game device according to an embodiment of the present invention will be described.

Figure 1:
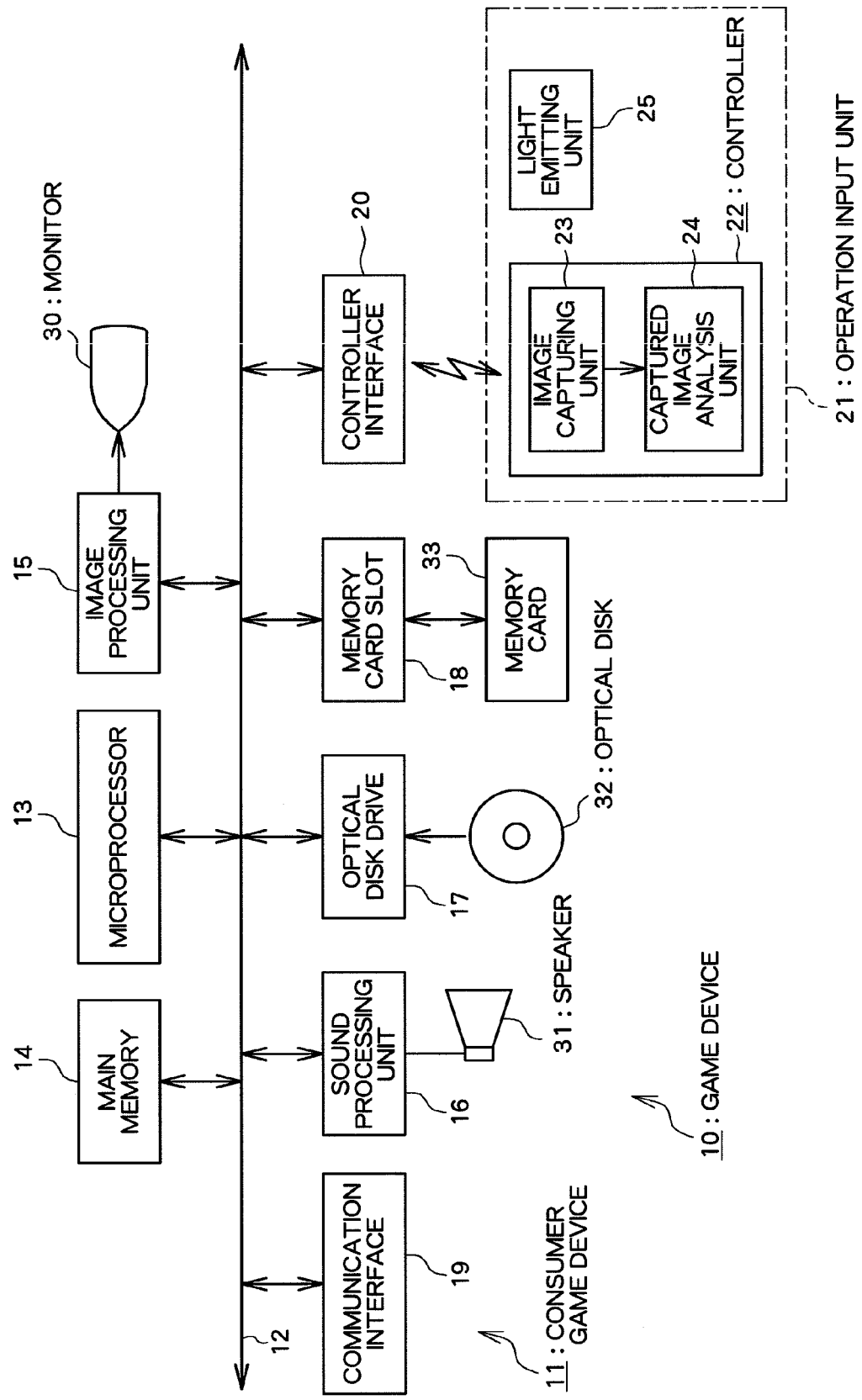
FIG. 1 is a diagram showing a hardware structure of a game device according to this embodiment.

FIG. 1 is a diagram showing a hardware structure of a game device according to an embodiment of the present invention. A game device 10 shown in FIG. 1 comprises a consumer game device 11, a monitor 30, a speaker 31, an optical disk 32, and a memory card 33. The monitor 18 and the speaker 31 are connected to the consumer game device 11. The optical disk 32 and the memory card 33 are information storage media, and mounted in the consumer game device 11. As the monitor 30, e.g., a home-use television set receiver is used. As the speaker 31, for example, a built-in speaker of a home-use television set receiver is used. As the optical disk 32, a CD-ROM, a DVD-ROM, or the like, is used.

The consumer game device 11 is a publicly known computer game system, and comprises a bus 12, a microprocessor 13, a main memory 14, an image processing unit 15, a sound processing unit 16, an optical disk drive 17, a memory card slot 18, a communication interface (I/F) 19, a controller interface (I/F) 20, and an operation input unit 21. Structural elements other than the operation input unit 21 are accommodated in the enclosure of the consumer game device 11.

The bus 12 is used to exchange addresses and data between the respective units of the consumer game device 11. The microprocessor 13, main memory 14, image processing unit 15, sound processing unit 16, optical disk drive 17, memory card slot 18, communication interface 19, and controller interface 20 are connected via the bus 12 for data exchange.

The microprocessor 13 controls the respective units of the consumer game device 11, based on an operating system stored in a ROM (not shown) and a program and data read from the optical disk 32 or the memory card 33. The main memory 14 comprises, e.g., a RAM. A program and data read from the optical disk 32 or the memory card 33 is written into the main memory 14 when required. The main memory 14 is used also as a working memory of the microprocessor 13.

The image processing unit 15 includes a VRAM, and renders a game screen image into the VRAM, based on the image data sent from the microprocessor 13. The image processing unit 15 converts the game screen image into a video signal, and outputs the resultant video signal to the monitor 30 at a predetermined time. The sound processing unit 16 includes a sound buffer. The sound processing unit 16 reproduces various sound data, such as game music, game sound effects, messages, and so forth, read from the optical disk 32 and stored in the sound buffer, and outputs via the speaker 31.

The optical disk drive 17 reads a program and data recorded in the optical disk 32 according to an instruction from the microprocessor 13. Note that although an optical disk 32 is used here to supply a program and data to the consumer game device 11, any other information storage medium, such as a memory card 33, and the like, may be used. Alternatively, a program and data may be supplied to the consumer game device 11 from a remote place through a data communication network, such as the Internet, and the like.

The memory card slot 18 is an interface for mounting the memory card 33. The memory card 33 includes a nonvolatile memory (e.g., EEPROM, and the like), in which various game data, e.g., save data, and the like, is stored. The communication interface 19 is an interface for communication to a data communication network, such as the Internet, and the like.

The controller interface 20 is an interface for radio connection to a plurality of controllers 22. As a controller interface 20, e.g., an interface according to the Bluetooth interface standard can be used. Note that the controller interface 20 may be an interface for wired connection to the controller 22.

Figure 2:
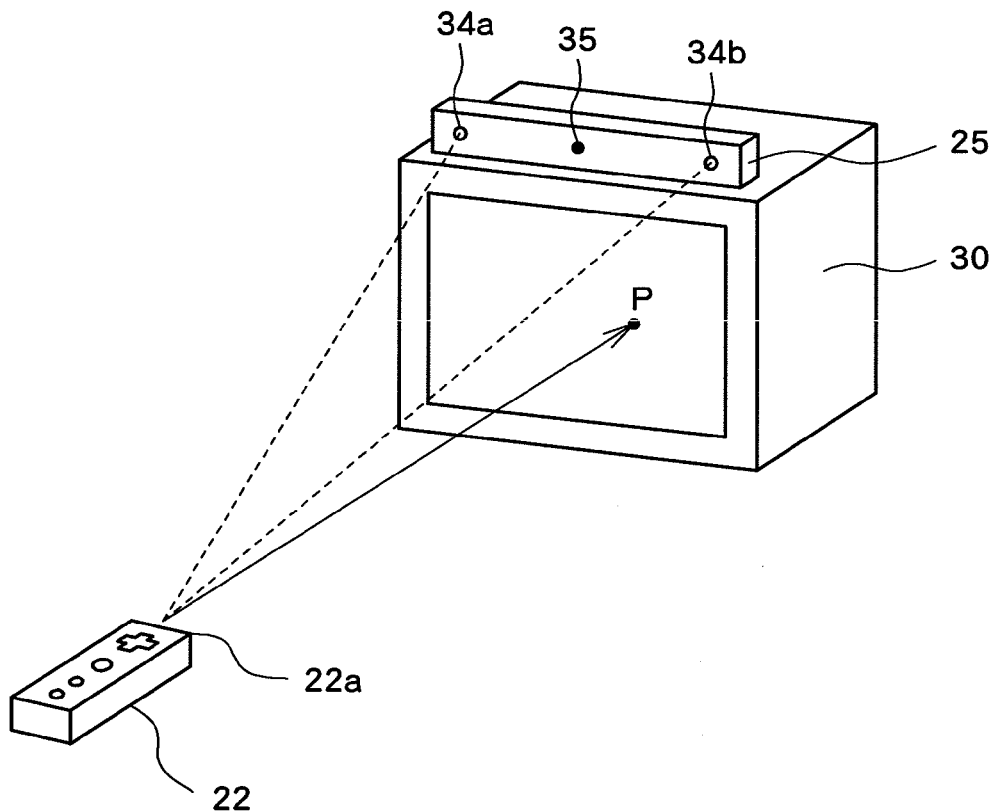
FIG. 2 is a diagram showing one example of an operation input unit.

The operation input unit 21 is used by a user to input an operation. The operation input unit 21 has a function as a pointing device for use by a user to point to a position in a game screen image shown on the monitor 30. As the operation input unit 21, e.g., the technique disclosed in JP 3262677 B can be used. The operation input unit 21 comprises one or more controllers 22 and a light emitting unit 25. FIG. 2 shows one example of the operation input unit 21, while FIG. 3 shows one example of the controller 22.

As shown in FIG. 2, the light emitting unit 25 has a plurality of light sources, and is placed on the upper portion of the monitor 30. In the example shown in FIG. 2, light sources 34a, 34b are provided in the respective ends portions of the light emitting unit 25. Alternatively, the emitting unit 25 may be provided in the lower portion of the monitor 30.

Figure 3:
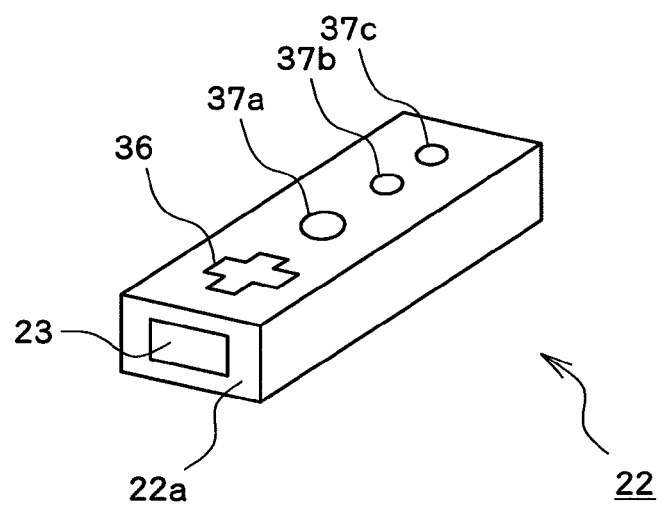
FIG. 3 is a diagram showing one example of a controller.

As shown in FIG. 3, the controller 22 has a direction button 36 and buttons 37a, 37b, 37c. The direction button 36 has a cross shape, and is generally used for an operation to designate a direction. The buttons 37a, 37b, 37c are used for various game operations. As shown in FIG. 1, the controller 22 additionally has an image capturing unit 23 and a captured image analysis unit 24. The image capturing unit 23 may be an image capturing element, such as, e.g., a CCD, and the like, and may be provided in the front end portion 22a (one lateral surface) of the controller 22. The captured image analysis unit 24 is, for example, a microprocessor, or the like, and is built into the controller 22.

When a user directs the front end portion 22a of the controller 22 toward the monitor 30, the light sources 34a, 34b are shown in an image captured by the image capturing unit 23. The captured image analysis unit 24 analyzes the positions of the light sources 34a, 34b shown in the image captured by the image capturing unit 23, and based on the analyzed result, obtains the position and inclination of the controller 22. For example, the captured image analyzing unit 24 calculates the relative position of the controller 22 relative to a predetermined reference position 35, and the inclination angle of the controller 32 relative to a straight line connecting the light source 34a and the light source 34b. While information concerning the positional relationship between the reference position 35 and the game screen image shown on the monitor 30 is stored, the game device 10 obtains screen coordinate values (coordinate values according to a screen coordinate system) of the position P pointed to by the front end 22a of the controller 22, based on the information stored and the position and inclination of the controller 22, obtained by the captured image analyzing unit 24. Note that the position (2) pointed to by the front end portion 22a of the controller 22 will be hereinafter referred to as a "position designated by the controller 22". Information describing the position and inclination of the controller 22, obtained by the captured image analyzing unit 24, that is, information specifying the screen coordinate values of a position designated by the controller 22, is hereinafter referred to as "pointing information".

The controller 22 sends to the microprocessor 13 an operating signal describing the state of operation of the controller 22, via the controller interface 20 every constant cycle (for example, every 1/60 of a second). The operating signal includes, for example, identification information identifying the controller 22, the above-described pointing information, and information describing whether or not each button is pressed. Based on an operating signal supplied from each controller 22, the microprocessor 13 specifies a position designated by the controller 22, and determines whether or not the direction button 36 and the buttons 37a, 37b, 37c of that controller 22 have been pressed.

In the game device 10 having the above described structure, for example, a soccer game which can be played by users is executed. This soccer game is realized by executing a program read from the optical disk 32. In the following, a case in which a soccer game is played by a first user and a second user will be described as an example.

Figure 4:
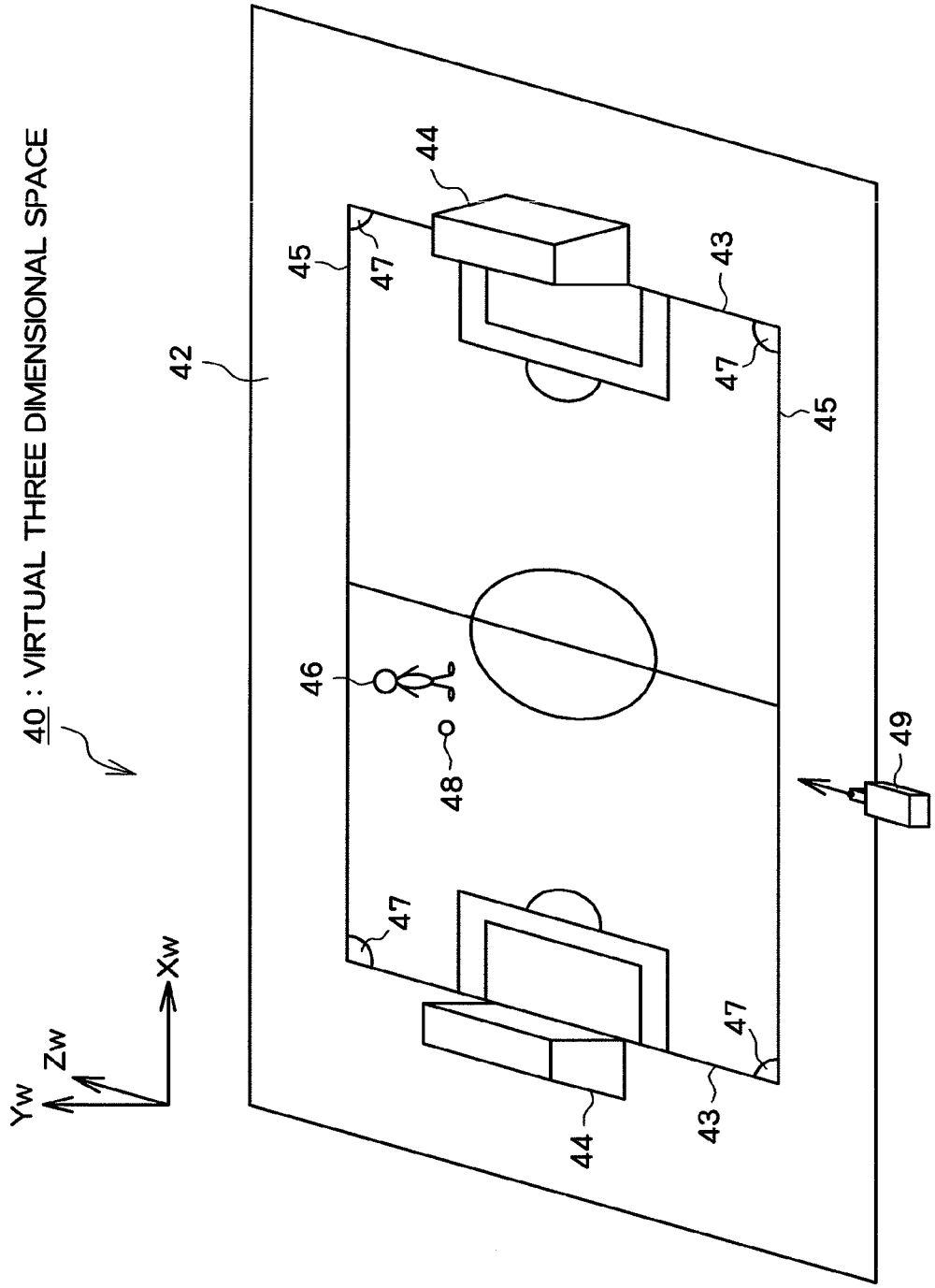
FIG. 4 is a diagram showing one example of a virtual three dimensional space.

A virtual three dimensional space (a game space) is created in the main memory 14. FIG. 4 shows one example of the virtual three dimensional space. As shown in FIG. 4, a field object 42 representative of a soccer field is placed in the virtual three dimensional space 40. For example, a goal line 43 and a touch line are shown on the field object 42, and a goal object 44 representative of a goal, a player object 46 (player character) representative of a soccer player, and a ball object 48 (moving object) representative of a soccer ball are placed on the field object 42. Although not shown in FIG. 4, eleven player objects 46 belonging to a team operated by a first user (hereinafter referred to as a "first team") and eleven player objects 46 belonging to a team operated by a second user (hereinafter referred to as a "second team") are placed on the field object 42.

When the player object 46 and the ball object 48 get close to each other, the player object 46 and the ball object 48 are caused to be correlated to each other under a predetermined condition, and the ball object 48 thereafter moves according to the movement of the player object 46. This can be expressed as the player object 46 being engaged in a dribble action. In the following, a state in which the ball object 48 is correlated to the player object 46 will be referred to as "the player object 46 holding the ball object 48".

One of the goal objects 44 is correlated to the first team, while the other is correlated to the second team. With the ball object 48 having been moved into the inside of the goal object 44 (within a predetermined area) correlated to one team, a score event occurs to the other team.

In addition, a virtual camera 49 (viewpoint) is set in the virtual three dimensional space 40. The virtual camera 49 moves in the virtual three dimensional space 40, based on, e.g., the movement of the ball object 48.

Figure 5:
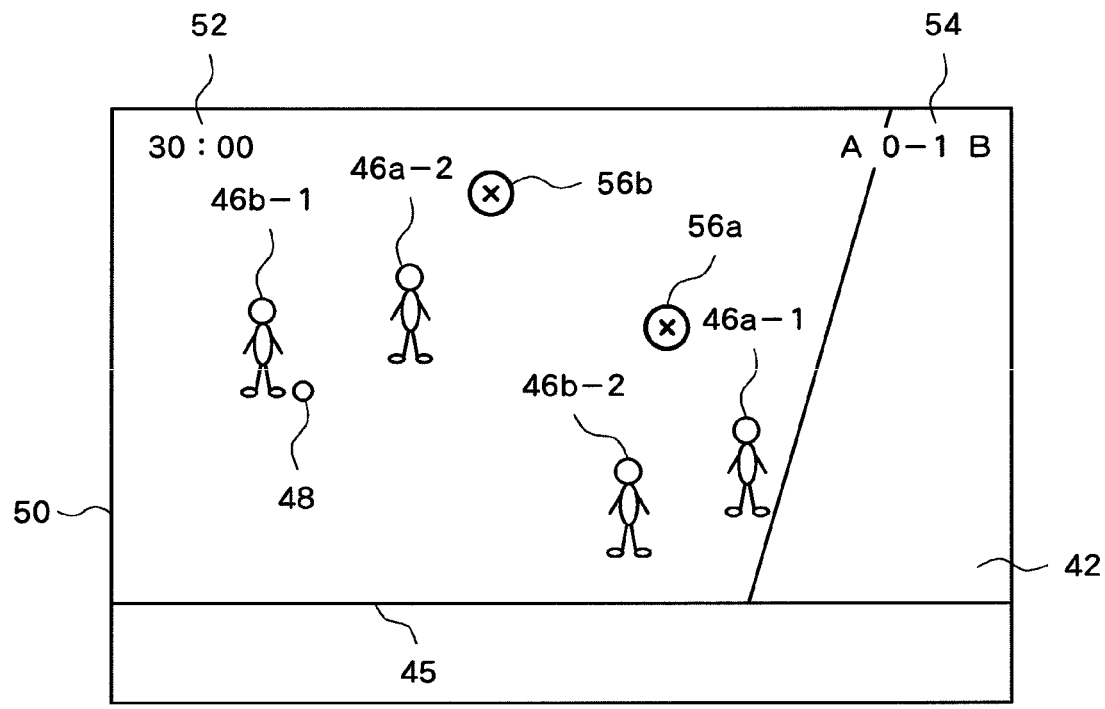
FIG. 5 is a diagram showing one example of a game screen image.

FIG. 5 shows one example of a game screen image 50. As shown in FIG. 5, an image showing a picture obtained by viewing the virtual three dimensional space 40 from the virtual camera 49 is shown as a game screen image 50. The game screen image 50 includes a time indication 52 showing a period of time elapsed and a score indication 54 showing a score. Further, a cursor 56a indicating the position designated by the controller 22 of the first user and a cursor 56b indicating the position designated by the controller 22 of the second user are also shown in the game screen image 50. Note that although the cursors 56a, 56b are round in this embodiment, the cursors 56a, 56b may have any other shape. Note that in FIG. 5, the player objects 46a-1, 46a-2 are player objects 46 belonging to the first teams, and the player objects 46b-1, 46b-2 are player objects 46 belonging to the second team.

Basically, the respective player objects 46 move according to a predetermined algorithm, though a user can designate a movement destination position and a kick destination position for a player object 46 belonging to the user team.

A method for designating a movement destination position and a kick destination position for a player object 46 will be described. Here, assume a case in which a second user gives a designation instruction to the player object 46b-1. In this case, initially, the second user selects the player object 46b-1. Specifically, the second user directs the front end portion 22a of the controller 22 to the player object 46b-1 to thereby move the cursor 56b to the player object 46b-1, and presses a selection button (e.g., the button 37b). Thereupon, the player object 46b-1 is selected as a target to which a designation instruction is given (an instruction target).

With the player object 46b-1 selected as an instruction target, the second user can designate a movement destination position for the player object 46b-1 by directing the front end portion 22a of the controller 22 in a direction towards this destination position. That is, the position of the cursor 56b (a position in the virtual three dimensional space 40, corresponding to the display position of the cursor 56b) is set as the movement destination position for the player object 46b-1, upon which the player object 46b-1 begins moving toward the movement destination position.

Further, when the player object 46b-1 holds the ball object 48 and is selected as an instruction target, the second user can designate a kick direction for the player object 46b-1 by directing the front end portion 22a of the controller 22 in the intended kicking direction. That is, in response to a kick instruction button (e.g., the button 37a) being pressed by the user, the position of the cursor 56b (a position in the virtual three dimensional space 40, corresponding to the display position of the cursor 56b) is set as a kick destination position, and the player object 46b-1 kicks the ball object 48 toward the kick destination position. For example, when the second user presses the kick instruction button with the cursor 56b having been moved to and placed on the player object 46b-2 in the game screen image 50 shown in FIG. 5, the player object 46b-1 makes a pass to the player object 46b-2.

The above described soccer game has a marking instruction function. A marking instruction function is a function which enables a user to instruct a player object 46 of the user team to mark a player object 46 of the opponent team. Note that "to mark" means to defend against a specific opponent player while keeping close to that player (while keeping the distance to the specific opponent player shorter than a predetermined distance).

Figure 6:
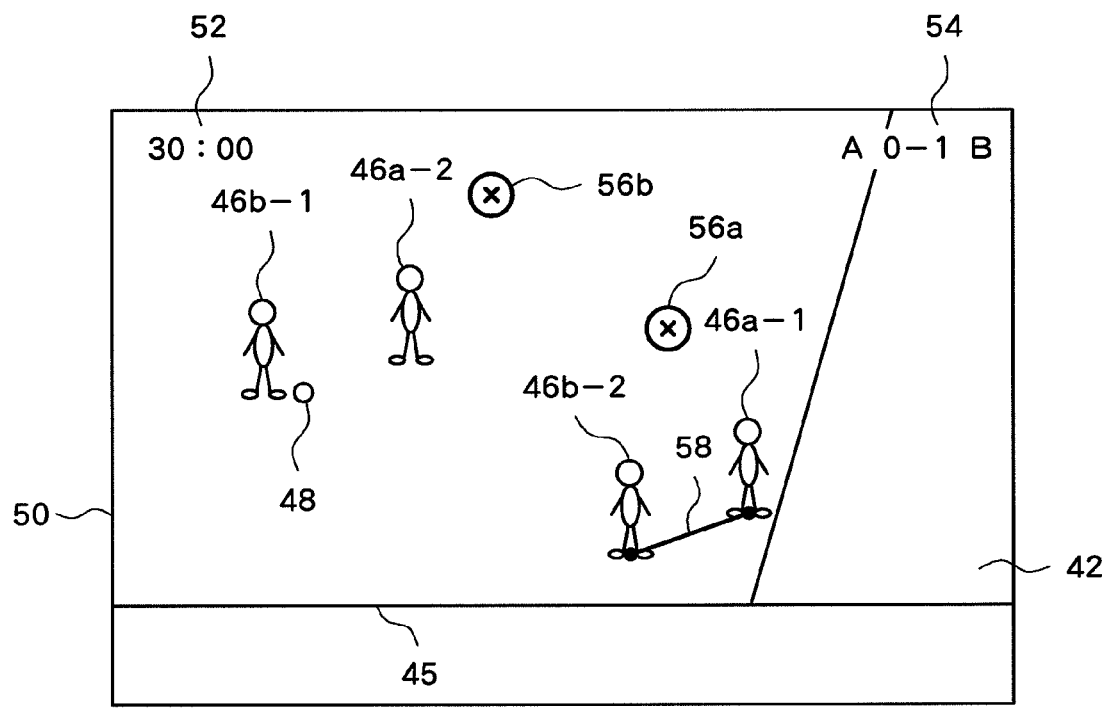
FIG. 6 is a diagram showing one example of a game screen image.

Here, assume a case in which the first user instructs to mark the player object 46b-2 in the situation shown in FIG. 5. In this case, initially, the first user selects the player object 46b-2. Specifically, the first user directs the front end portion 22a of the controller 22 to the player object 46b-2 to thereby move the cursor 56a so as to be placed on the player object 46b-2, and presses the selection button (e.g., the button 37b). Thereupon, the player object 46b-2 is selected as a target to be marked (marking target). With the player object 46b-2 selected as a marking target, a player object 46 located closest to the player object 46b-2, among the player objects 46 belonging to the first team, is selected as a marker who marks the player object 46b-2. For example, in the situation shown in FIG. 5, the player object 46a-1 is selected as a marker. In this case, the player object 46b-2 and the player object 46a-1 are caused to be correlated to each other, and the player object 46a-1 begins marking the player object 46b-2. FIG. 6 shows a game screen image 50 to be shown in the above. In this case, a line image 58 connecting the player object 46a-1 and the player object 46b-2 is shown. By referring to the line image 58, the user can know that the player object 46b-2 and the player object 46a-1 are correlated to each other.

Alternatively, marking a player object 46 of the opponent team may be instructed as follows. Here again assume a case in which the first user instructs to mark the player object 46b-2 in the situation shown in FIG. 5. In this case, the first user initially places the cursor 56a on any player object 46 (a player object 46a-1, here) among the player objects 46 belonging to the first team, and then moves the cursor 56a to be placed on the player object 46b-2, while pressing the selection button (e.g., the button 37b), and then releases the pressed selection button. Thereupon, the player object 46b-2 and the player object 46a-1 are caused to be correlated to each other, and the player object 46a-1 begins marking the player object 46b-2. As described above, an arrangement for enabling a user to select both of the marker and the marking target may be applied.

Note that a player object 46 which marks a player object 46 of the opponent team will be hereinafter referred to as a "marker player object", and that a player object 46 to be marked by a marker player object will be hereinafter referred to as a "marking target player object". Moreover, a player object 46 which holds the ball object 48 will be hereinafter referred to as a "ball holding player object".

Figure 7:
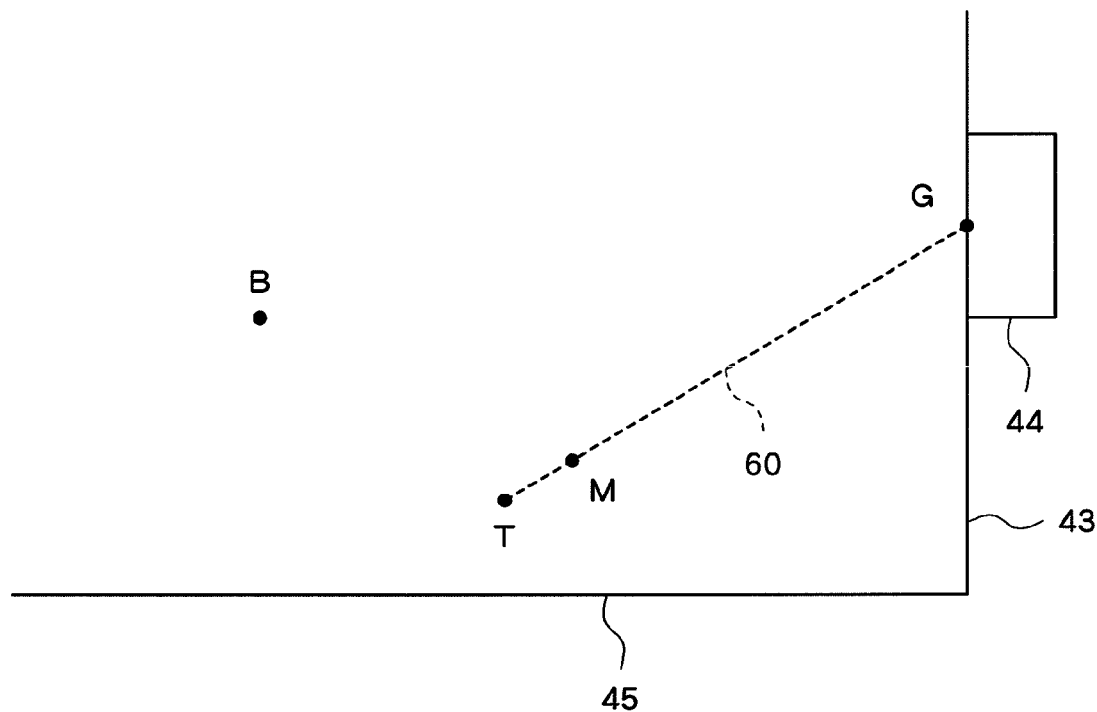
FIG. 7 is a diagram explaining a normal mode.
Figure 8:
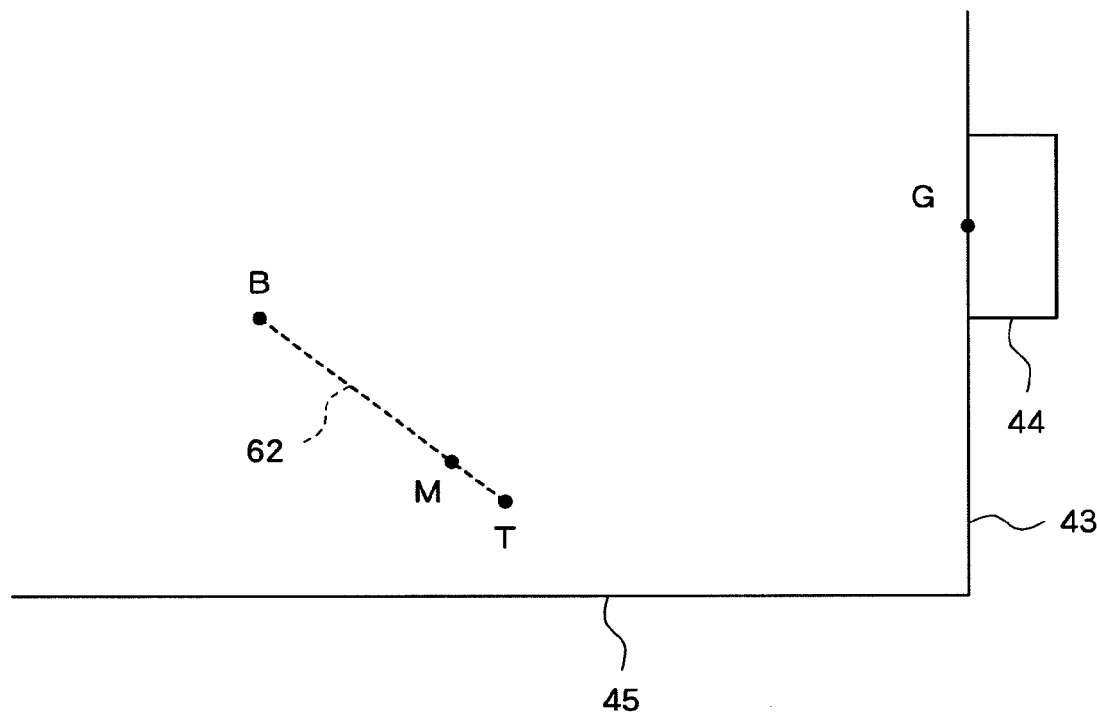
FIG. 8 is a diagram explaining an intercept mode.

A marker player object acts in a "normal mode" or an "intercept mode". FIGS. 7 and 8 are diagrams explaining the "normal mode" and the "intercept mode". In these diagrams, the position (B) indicates the position of a ball holding player object (or the ball object 48); the position (T) indicates the position of a marking target player object; the position (M) indicates the position of a marker player object; and the position (G) indicates a representative point of the goal object 44 of the team to which the marker player object belongs.

The "normal mode" is a mode in which a marker player object tries to prevent a marking target player object from receiving a pass from a ball holding player object and pushing toward the goal object 44. As shown in FIG. 7, in the "normal mode", the position (M) of the marker player object is controlled so as to be located on the straight line 60 connecting the representative point (G) of the goal object 44 of the team to which the marker player object belongs and the position (T) of the marking target player object.

The "intercept mode" is a mode in which a marker player object tries to intercept a pass from a ball holding player object to a marking target player object. As shown in FIG. 8, in the "intercept mode", the position (M) of the marker player object is controlled so as to be located on the straight line 62 connecting the position (T) of the marking target player object and the position (B) of the ball holding player object.

Note that both in the "normal mode" and the "intercept mode", when a marking target player object holds the ball object 48, a marker player object tries to deprive the marking target player object of the ball object 48 according to a predetermined algorithm.

A user can switch the action mode (hereinafter referred to as a "marker action mode") of a marker player object belonging to the user team by, e.g., pressing a switching instruction button (e.g., the button 31).

For example, in the situation shown in FIG. 5, the first user needs to defend against the player object 46b-2 which is highly likely to receive a pass from the player object 46b-1, while defending against the player object 46b-1 holding the ball object 48. Specifically, the first user needs to carry out a game operation, while defending against the player object 46b-2 by trying to prevent the player object 46b-2 from receiving a pass from the player object 46b-1 and pushing toward the goal object 44, so as to intercept a pass from the player object 46b-1 to the player object 46b-2. Without a marking instruction function, the first user would need to defend against the player object 46b-1 and the player object 46b-2 while switching the instruction target between the player object 46a-1 and the player object 46a-2. Such an operation, however, may be difficult to achieve for some users (in particular, a user at a low training level).

Regarding this point, using the marking instruction function, a user can instruct a player object 46 of the user team to mark the player object 46b-2 by pressing the selection button while holding the controller 22 such that the front end portion 22a thereof is directed to the player object 46b-2. In addition, the user can instruct, by pressing the switching instruction button, a player object 46 (player object 46a-1) marking the player object 46b-2 to either try (A) to prevent the player object 46b-2 from receiving a pass from the player object 46b-1 and pushing toward the goal object 44 or (B) to intercept a pass from the player object 46b-1 to the player object 46b-2. That is, using the marking instruction function, the first user can instruct, through a relatively simple operation, to defend against the player object 46b-2 which is highly likely to receive a pass from the player object 46b-1. As a result, the first user, while defending against the player object 46b-1 holding the ball object 48 by operating the player object 46a-2, can instruct the player object 46a-1 to defend against the player object 46b-2 which is highly likely to receive a pass from the player object 46b-1 by pressing the switching instruction button. That is, the marking instruction function can enhance operability for a user when a player object 46 of the opponent team holds the ball object 48. In the following, a structure for realizing the marking instruction function will be described.

FIG. 9 is a functional block diagram mainly showing a function according to the present invention among those realized in the game device 10. As shown in FIG. 9, the game device 10 comprises a game situation data storage unit 70 (player character state storage means), a game situation data update unit 72, and a display control unit 74. These functional blocks are realized by the microprocessor 13 by executing a program.

The game situation data storage unit 70 is realized using, for example, the main memory 14. Game situation data describes the current situation of a game and is stored in the game situation data storage unit 70. FIG. 10 shows one example of game situation data. Game situation data includes match time data and score data. The game situation data includes position data of the cursor 56*a* of the first user and position data of the cursor 56*b* of the second user. Cursor position data is data describing, for example, the display position of a cursor or a position in the virtual three dimensional space 40, corresponding to the display position of a cursor. The game situation data includes the state data of the virtual camera 49 and the state data of the ball object 48. The state data of the virtual camera 49 includes position data, posture (viewing direction) data, and so forth. The state data of the ball object 48 includes position data, movement direction and speed data, and so forth. The game situation data includes state data of each of the player objects 46 belonging to the first and second teams, respectively. The state data of the player object 46 includes position data, posture data, movement direction and speed data, an instruction target flag, a ball holding flag, a marker flag, a marking target player ID, a marker action mode flag, and the like. An "instruction target flag" is data indicating whether or not a player object 46 is being selected as an instruction target. A "ball holding flag" is data indicating whether or not a player object 46 is holding the ball object 48. A "marker flag" is data indicating whether or not a player object 46 is a marker player object. A "marking target player ID" is data indicating the ID (identification information) of a player object 46 which the player object 46 is marking. A "marker action mode flag" is data describing the current marker action mode of a player object 46. The marker action mode of each player object 46 is set to the "normal mode" at the beginning of a match. Note that, in FIG. 10, "player object (A01)", "player object (A02)", and "player object (A11)" are player objects 46 of the first team, while "player object (B01)" and "player object (B11)" are player objects 46 of the second team.

The game situation data update unit 72 is realized mainly using the microprocessor 13, for example. The game situation data update unit 72 updates the game situation data stored in the game situation data storage unit 70. The game situation data update unit 72 comprises, as a structure related to the marking instruction function, a marking target selection unit 72*a*, a marker selection unit 72*b*, a marker control unit 72*c*, a switching condition determination unit 72*f*, and a marker control switching unit 72*g*.

The marking target selection unit 72*a* selects a marking target player object from among the player objects 46 belonging to the opponent team. The marker selection unit 72*b* selects a marker player object from among the player objects 46 belonging to the user team.

In this embodiment, the marking target selection unit 72*a* selects a marking target player object from among the player objects 46 belonging to the opponent team according to a selection operation carried out by a user. That is, the marking target selection unit 72*a* receives user selection of a marking target player object. After selection of a marking target player object, the marker selection unit 72*b* selects a marker player object from among the player objects 46 belonging to the team operated by the user, based on the position of the marking target player object and the positions of the respective player objects 46 belonging to the user team. For example, the marker selection unit 72*b* may select, as a marker player object, a player object 46 located closest to the position of the marking target player object from among the player objects 46 belonging to the user team.

Note that alternatively, the marker selection unit 72*b* may select a marker player object from among the player objects 46 belonging to the user team according to a selection operation carried out by a user. In this case, after selection of a marker player object, the marking target selection unit 72*a* may select a marking target player object from among the player objects 46 belonging to the opponent team, based on the position of the marker player object and the positions of the respective player objects 46 belonging to the opponent team. For example, the marking target selection unit 72*a* may select, as a marking target player object, a player object 46 located closest to the position of the marker player object from among the player objects 46 belonging to the opponent team.

[Marker Control Unit]

The marker control unit 72*c* controls a marker player object. The marker control unit 72*c* comprises a first marker control unit 72*d* and a second marker control unit 72*e*.

The first marker control unit 72*d* corresponds to the "normal mode". An operation of the first marker control unit 72*d* will be described referring to FIG. 7. The first marker control unit 72*d* controls the position (M) of the marker player object, based on the position (T) of the marking target player object and the representative point (G) of the goal object 44 of the team to which the marker player object belongs. In this embodiment, the first marker control unit 72*d* controls the movement of the marker player object such that the position (M) of the marker player object is located on the straight line 60 connecting the position (T) of the marking target player object and the representative point (G) of the goal object 44 of the team to which the marker player object belongs.

Meanwhile, the second marker control unit 72*e* corresponds to the "intercept mode". An operation of the second marker control unit 72*e* will be described referring to FIG. 8. The second marker control unit 72*e* controls the position (M) of the marker player object, based on the position (T) of the marking target player object and the position (B) of the ball holding player object (or the ball object 48). In this embodiment, the second marker control unit 72*e* controls the movement of the marker player object such that the position (M) of the marker player object is located on the straight line 62 connecting the position (T) of the marking target player object and the position (B) of the ball holding player object.

The switching condition determination unit 72*f* determines whether or not a predetermined switching condition is satisfied. For example, the switching condition includes a condition for determining whether or not a predetermined switching instruction operation (e.g., pressing a switching instruction button) is carried out.

The marker control switching unit 72*g* switches between a state in which the first marker control unit 72*d* controls the movement of a marker player object and a state in which the second marker control unit 72*e* controls the movement of a marker player object. The marker control switching unit 72*g* effects the switching based on the result of determination by the switching condition determination unit 72*f*. In this embodiment, the marker control switching unit 72g effects the above described switching when a predetermined switching instruction operation is carried out.

The display control unit 74 is realized mainly using, for example, the microprocessor 13 and the image processing unit 15. The display control unit 74 renders a game screen image 50 into a VRAM, based on the game situation data stored in the game situation data storage unit 70. The game screen image 50 rendered in the VRAM is output at a predetermined time to be displayed on the monitor 30.

Figure 11:
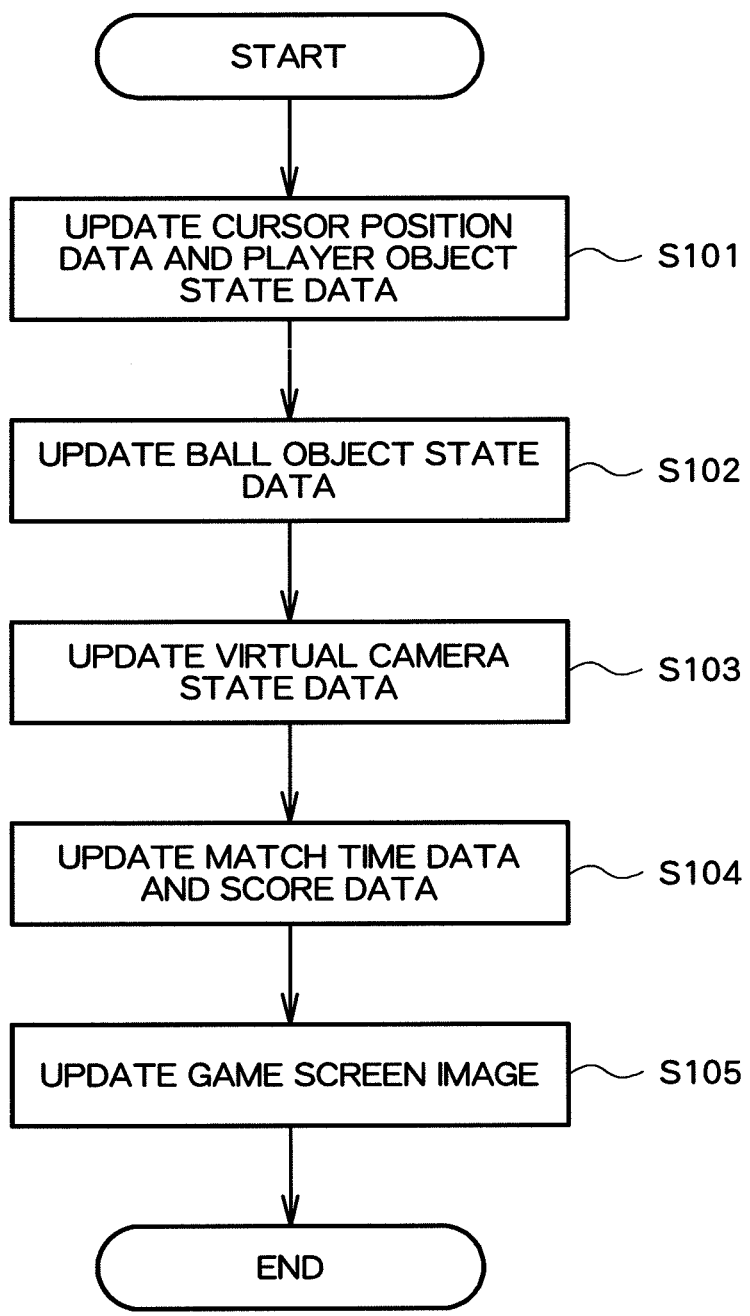
FIG. 11 is a flowchart of a process to be carried out in the game device.

In the following, a process to be carried out by the game device 10 to realize the above-described function blocks will be described. FIG. 11 is a flowchart of a process to be carried out by the game device 10 every predetermined period of time (e.g., $\frac{1}{60}^{th}$ of a second). The microprocessor 13 carries out the process shown in FIG. 11 according to a program stored in the optical disk 32.

Figure 12:
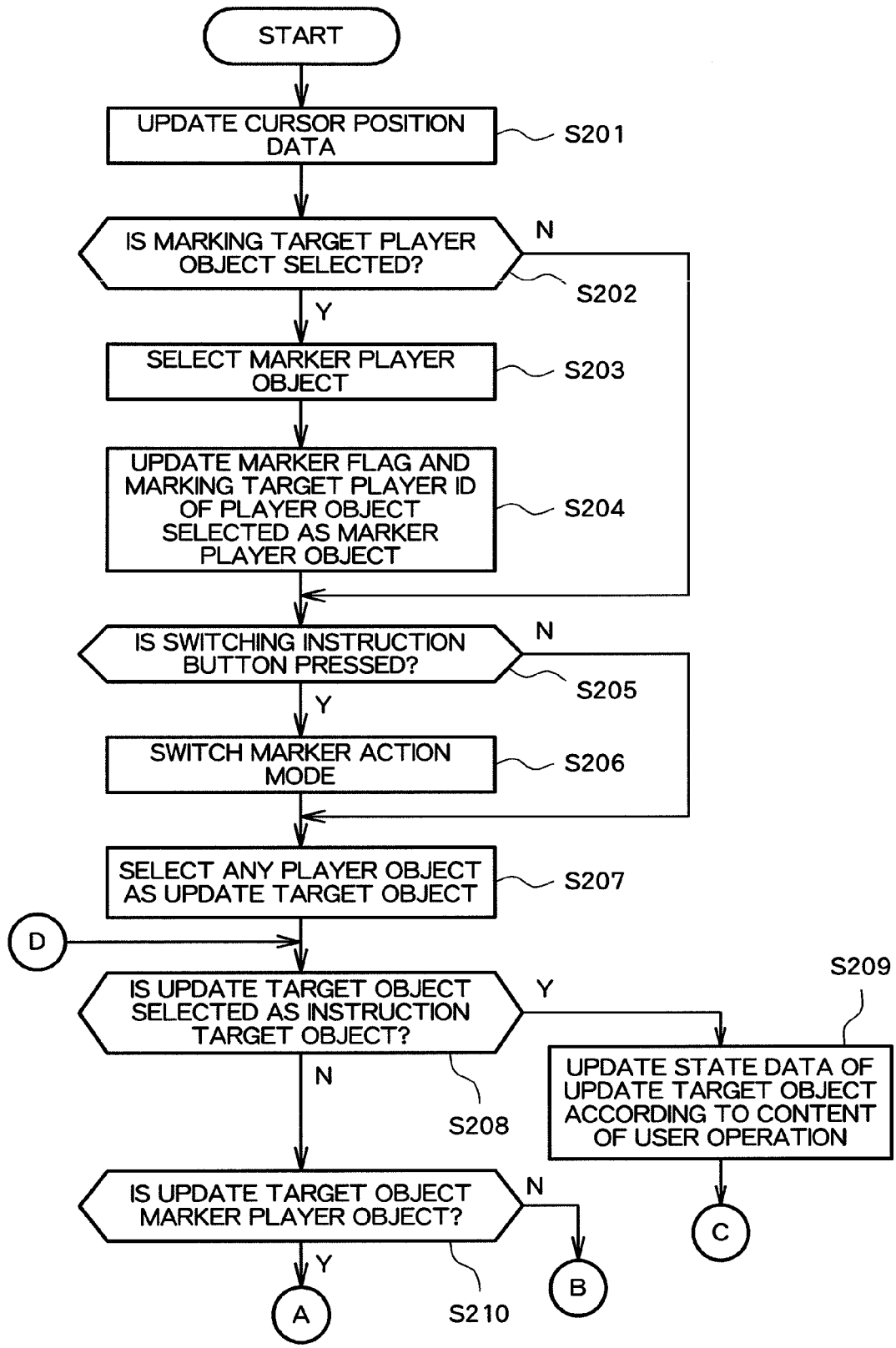
FIG. 12 is a flowchart of a process to be carried out in the game device.
Figure 13:
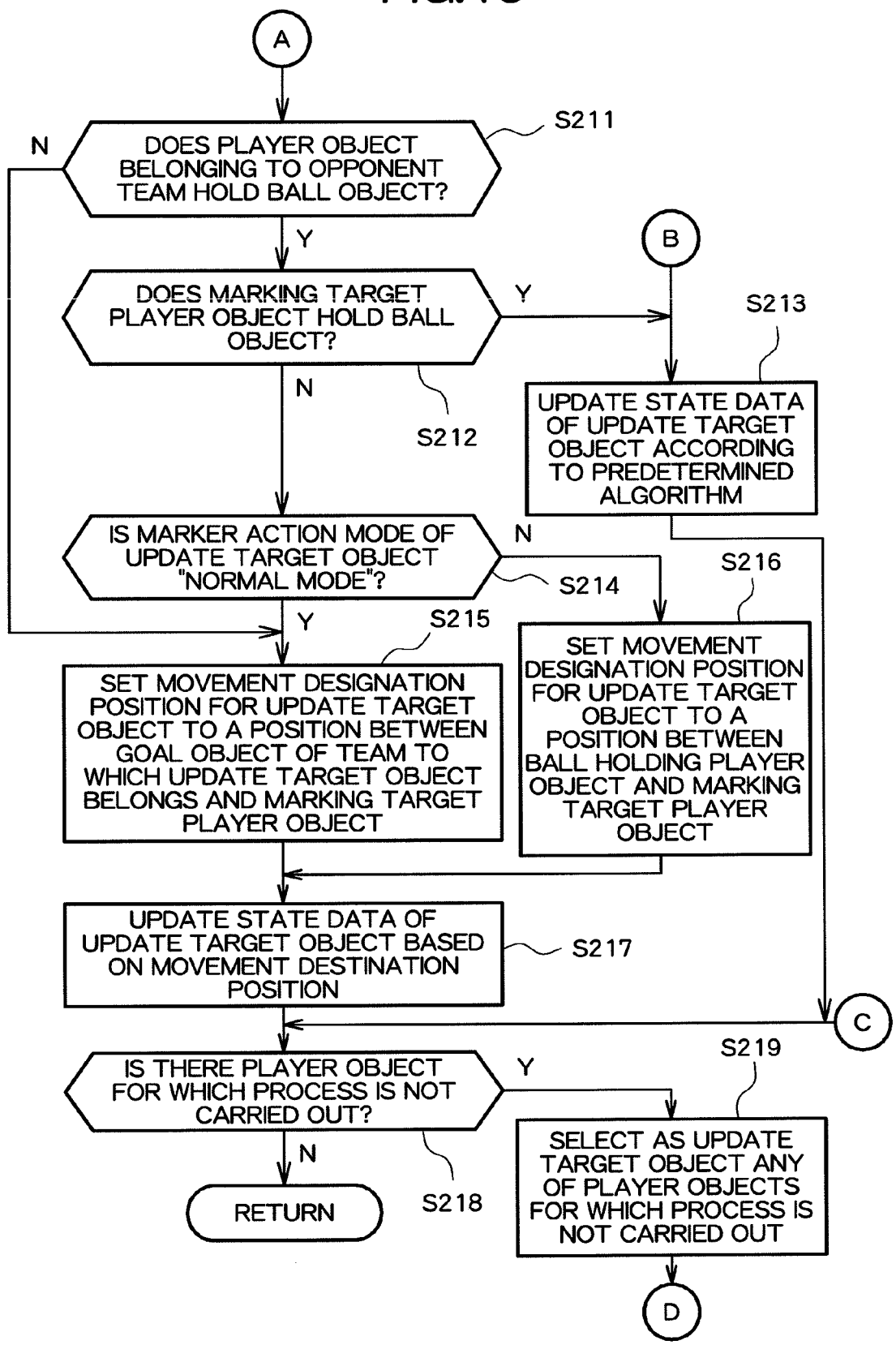
FIG. 13 is a flowchart of a process to be carried out in the game device.

As shown in FIG. 11, the microprocessor 13 (game situation data update unit 72) updates the position data of the cursors 56a, 56b and the state data of the respective player objects 46 (S101). FIGS. 12 and 13 are flowcharts of a process to be carried out in this step.

In the process shown in FIGS. 12 and 13, based on an operating signal (pointing information) supplied from the controller 22 of a user, initially, the microprocessor 13 updates the position data of the cursor corresponding to the user (S201). For example, the position data of the cursor 56a is updated, based on an operating signal supplied from the controller 22 of the first user. This is similarly applied to the second user.

Further, based on the operating signal supplied from the controller 22 of the user, the microprocessor 13 (marking target selection unit 72a) determines whether or not the user has selected a marking target player object (S202). For example, whether or not the first user has pressed the selection button is determined. With determination that the first user has pressed the selection button, it is then determined whether or not the front end portion 22a of the controller 22 of the first user is directed to any of the player objects 46 belonging to the opponent team (second team). When the front end portion 22a of the controller 22 of the first user is directed to any of the player objects 46 belonging to the opponent team, it is determined that the player object 46 is selected as a marking target player object. This is similarly applied to the second user.

When it is determined that the user has selected a marking target player object, the microprocessor 13 (marker selection unit 72b) then selects a marker player object for the marking target player object (S203). For example, with a marking target player object having been selected by the first user, a player object 46 located closest to the position of the marking target player object, among the player objects 46 belonging to the first team, is selected as a marker player object. In this case, the microprocessor 13 updates the marker flag and the marking target player ID of the player object 46 selected as the marker player object (S204). In the above, the marking target player ID is updated to the ID of the player object 46 selected by the user as a marking target player object.

Note that although not shown in FIG. 12, the microprocessor 13 also determines whether or not the user has selected any player object 46 as an instruction target, and based on the determination result, updates the instruction target flags of the respective player objects 46 belonging to the user team.

After the process at S202 to S204, the microprocessor 13 (switching condition determination unit 72f) determines whether or not the user has pressed the switching instruction button (S205). With determination that the user has pressed the switching instruction button, the microprocessor 13 (marker control switching unit 72g) updates the marker action mode flags of all of the player objects 46 belonging to the user team, and switches the marker action modes of all of the player objects 46 belonging to the user team from the "normal mode" to the "intercept mode", or vice versa (S206).

After the process at S205 and S206, the microprocessor 13 selects any of the player objects 46 as an update target object (S207), and carries out an update process (S208 to S217) of the state data of the update target object. Initially, the microprocessor 13 reads the instruction target flag of the update target object from the game situation data, and determines whether or not the update target object is currently selected as an instruction target for a user (S208).

When the update target object is currently selected as an instruction target for a user, the microprocessor 13 updates the state data of the update target object, based on an operating signal supplied from the controller 22 of the user (S209). For example, the state data of the update target object is updated such that the update target object moves toward the position in the virtual three dimensional space 40, corresponding to the display position of the cursor of the user. Also, for example, whether or not the kick instruction button has been pressed is determined based on an operating signal supplied from the controller 22. When it is determined that the kick instruction button has been pressed, the state data of the update target object is updated such that the update target object carries out a kick action.

Meanwhile, when the update target object is not selected as an instruction target for the user, the microprocessor 13 reads the marker flag of the update target object from the game situation data to determine whether or not the update target object is a marker player object (S210). When the update target object is not a marker player object, the microprocessor 13 updates the state data of the update target object according to a predetermined algorithm (S213).

Meanwhile, when the update target object is a marker player object, the microprocessor 13 determines whether or not any player object 46 of the opponent team holds the ball object 48 (S211). When any player object 46 of the opponent team holds the ball object 48, the microprocessor 13 reads the marking target player ID of the update target object from the game situation data to specify a player object 46 (marking target player object) to be marked by the update target object. Then, the microprocessor 13 determines whether or not the marking target player object holds the ball object 48 (S212). When the marking target player object holds the ball object 48, the microprocessor 13 updates the state data of the update target object according to a predetermined algorithm (S213). For example, the state data of the update target object is updated such that the update target object acts so as to deprive the ball object 48 from the marking target player object.

Meanwhile, when the marking target player object does not hold the ball object 48, the microprocessor 13 reads the marker action mode flag of the update target object from the game situation data to determine whether or not the marker action mode of the update target object is the "normal mode" (S214).

When the marker action mode of the update target object is the "normal mode", the microprocessor 13 (first marker control unit 72d) determines the movement destination position for the update target object, based on the position (T) of the player object 46 (marking target player object) marked by the update target object and the representative point (G) of the goal object 44 of the team to which the update target object belongs (S215: see FIG. 7). For example, a position on the straight line 60 from the position (T) of the marking target player object to the representative point (G) of the goal object 44 with the distance from the position (T) of the marking target player object being a predetermined distance is determined as the movement destination position.

Meanwhile, when the marker action mode of the update target object is not the "normal mode" but the "intercept mode", the microprocessor 13 (second marker control unit 72*e*) determines the movement destination position for the update target object, based on the position (T) of the player object 46 (marking target player object) marked by the update target object and the position (B) of the ball holding player object (B) (S216: see FIG. 8). For example, a position on the straight line 62 from the position (T) of the marking target player object to the position (B) of the ball holding player object with the distance from the position (T) of the marking target player object being a predetermined distance is determined as the movement destination position.

Note that when it is determined at S211 that no player object 46 of the opponent team is holding the ball object 48, the microprocessor 13 determines the movement destination position for the update target object in a manner similar to that in the case where the marker action mode of the update target object is the "normal mode" (S215).

With the movement destination position for the update target object determined at S215 or S216, the microprocessor 13 (first marker control unit 72*d* and second marker control unit 72*e*) updates the state data of the update target object, based on the movement destination position for the update target object (S217). That is, the state data of the update target object is updated such that the update target object moves toward the movement destination position.

After the process at S208 to S217, the microprocessor 13 determines whether or not there is any player object 46 for which a state data update process (S208 to S217) has not yet been carried out (S218). When there is any such player object 46, any of such player objects 46 is selected as a new update target object (S219), and a state data update process (S208 to S217) is carried out relative to the update target object. Meanwhile, when there is no such player object 46, this process is terminated.

Note that although not shown in FIGS. 12 and 13, when a predetermined release operation is carried out, the marker flag and the marking target player ID of a marker player object belonging to the team of a user having carried out the release operation are reset. That is, the player object 46 which is the marker player object no longer marks the player object 46 of the opponent team.

As shown in FIG. 11, after the position data of the cursors 56*a*, 56*b* and the state data of the respective player objects 46 are updated, the microprocessor 13 (game situation data update unit 72) updates the state data of the ball object 48 (S102). For example, the position of the ball object 48 is updated to a position displaced from the current position in the movement direction by a distance in accordance with the moving speed. Also, for example, when any player object 46 kicks the ball object 48, the state data of the ball object 48 is updated such that the ball object 48 moves in the kick direction.

Thereafter, the microprocessor 13 (game situation data update unit 72) updates the state data of the virtual camera 49 (S103). For example, the state data of the virtual camera 49 is updated based on the position of the ball object 48, and the like. In addition, the microprocessor 13 (game situation data update unit 72) updates the match time data and the score data (S104). For example, when the ball object 48 has moved into the goal object 44 of one team, a score event occurs to the other team so that the score of the other team is increased.

Thereafter, the microprocessor 13 and the image processing unit 15 (display control unit 74) update the game screen image 50, based on the game situation data (S105). Initially, an image showing a picture obtained by viewing the virtual three dimensional space 40 from the virtual camera 49 is rendered into the VRAM. Thereafter, the time indication 52 and the score indication 54 are written into the respective predetermined positions in the image rendered in the VRAM. Further, the cursors 56*a* and 56*b* are written on the image rendered in the VRAM. The image having been rendered in the VRAM as described above is output as a game screen image 50 to be displayed on the monitor 30.

The above described game device 10 has a marking instruction function. The marking instruction function enables a user, when, for example, a player object 46 of the opponent team holds the ball object 48, to cause a player object 46 of the user team to mark a player object 46 which is highly likely to receive a pass from that player object 46. Further, a user, by pressing the switching instruction button, can instruct a marker player object to either try (A) to prevent a marking target player object from receiving a pass from a ball holding player object and pushing toward the goal object 44 or (B) to intercept a pass from a ball holding player object to a marking target player object. That is, using the marking instruction function, a user, through a relatively simple operation, can defend against a player object 46 which is highly likely to receive a pass from a ball holding player object. As a result, a user, defending against a ball holding player object by operating a player object 46 located close to the ball holding player object, can instruct a player object of the user team to defend against a player object 46 which is highly likely to receive a pass from the ball holding player object by pressing the switching instruction button. That is, the game device 10 (marking instruction function) can enhance operability for a user when a player object 46 of the opponent team holds the ball object 48.

Note that the present invention is not limited to the above-described above embodiment.

Figure 14:
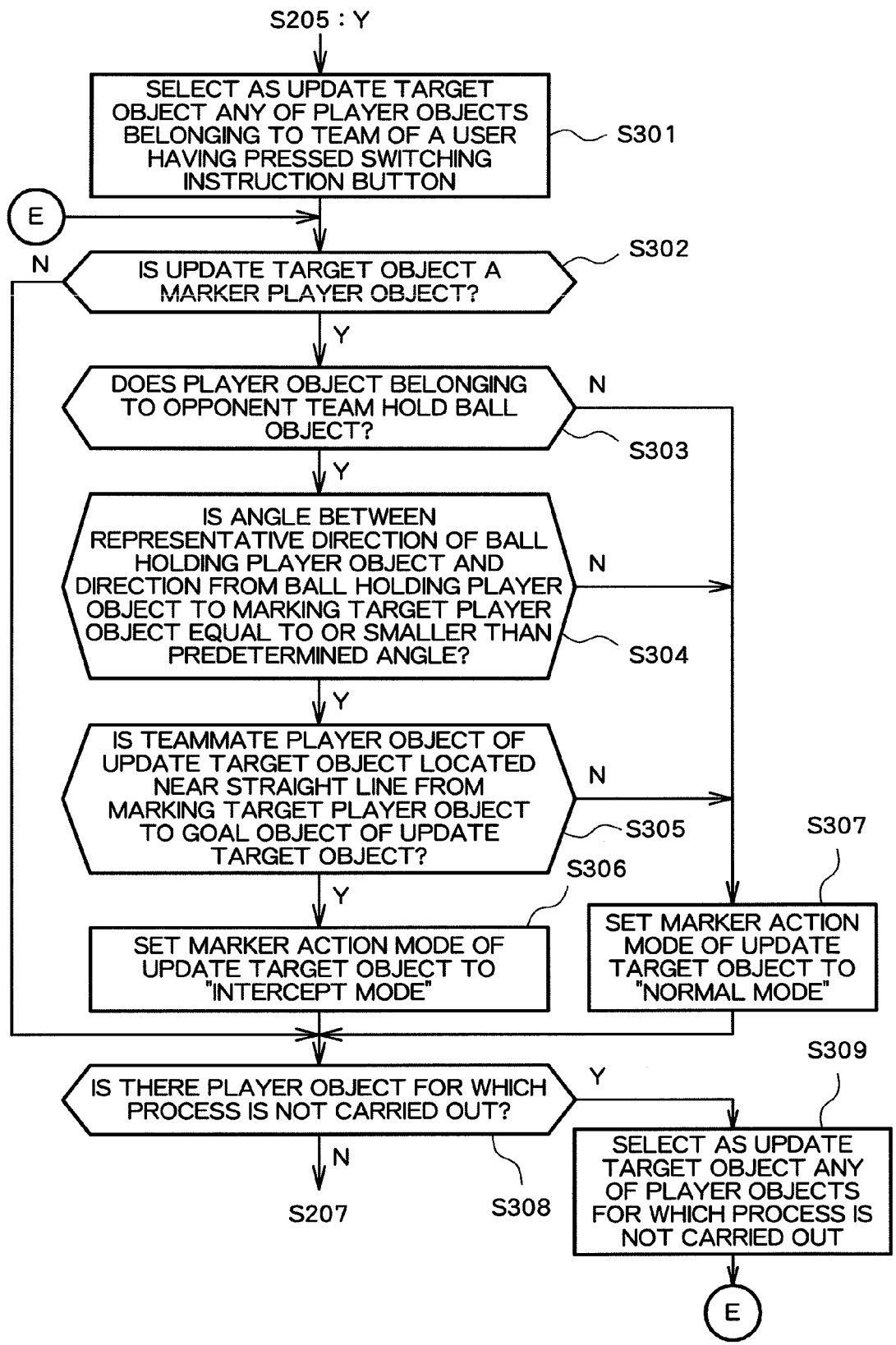
FIG. 14 is a flowchart of a process to be carried out in the game device.
Figure 15:
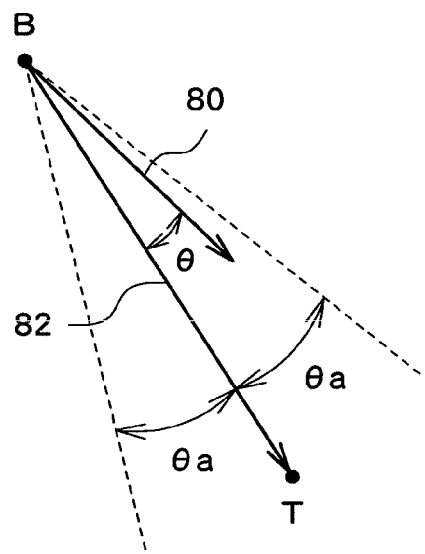
FIG. 15 is a diagram showing one example of a switching condition.
Figure 16:
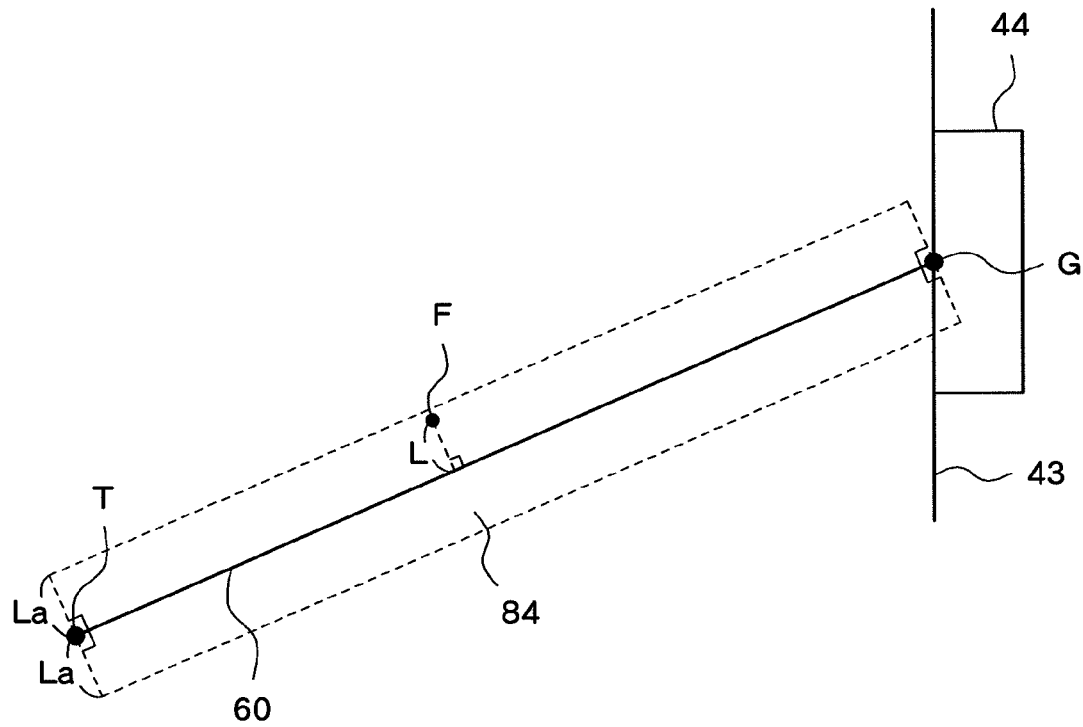
FIG. 16 is a diagram showing one example of a switching condition.

For example, the switching condition to be determined by the switching condition determination unit 72*f* may include a condition concerning a representative direction of a ball holding player object and the direction from the ball holding player object (or the ball object 48) to a marking target player object. The switching condition may also include a condition for determining whether or not any other player object 46 (hereinafter referred to as a "teammate player object") belonging to the team to which a marker player object belongs is located within an area specified based on the position of the marking target player object and the position of the goal object 44 of the team to which the marker player object belongs. FIG. 14 is a flowchart of a process to be carried out in the game device 10 in the above described case; FIGS. 15 and 16 are diagrams explaining the content of the process. The process shown in FIG. 14 is carried out instead of the process at S206 in FIG. 12.

When it is determined at S205 in FIG. 12 that the user has pressed the switching button, the microprocessor 13, in the process shown in FIG. 14, selects any of the player objects 46 belonging to the user team as an update target object (S301), and carries out an update process (S302 to S307) of the marker action mode (marker action mode flag) of the update target object. Specifically, the microprocessor 13 determines whether or not the update target object is a marker player object (S302). When the update target object is a marker player object, the microprocessor 13 determines whether or not any player object 46 belonging to the opponent team holds the ball object 48 (S303). When no player object 46 belonging to the opponent team holds the ball object 48, the microprocessor 13 updates the marker action mode flag of the update target object to set the marker action mode of the update target object to the "normal mode" (S307).

Meanwhile, when any player objects 46 belonging to the opponent team holds the ball object 48, the microprocessor 13 reads the marking target player ID of the update target object from the game situation data to specify the player object 46 (marking target player object) to be marked by the update target object. Then, the microprocessor 13 (switching condition determination unit 72f) determines whether or not the angle (θ) between the representative direction 80 of the ball holding player object and the direction 82 from the position (B) of the ball holding player object to the position (T) of the marking target player object is equal to or smaller than a predetermined reference angle (θa), as shown in FIG. 15 (S304). For example, whether or not an inner product of a vector indicating the representative direction 80 of the ball holding player object and a vector indicating the direction 82 from the position (B) of the ball holding player object to the position (T) of the marking target player object is within a predetermined value range is determined. Note that the representative direction 80 of the ball holding player object is a viewing direction or the forward direction of the face or body of the ball holding player object, which is specified based on the posture data of the ball holding player object.

When the above described angle (θ) is not equal to or smaller than the reference angle (θa), the microprocessor 13 (marker control switching unit 72g) sets the marker action mode of the update target object to the "normal mode" (S307). Meanwhile, when the above described angle (θ) is equal to or smaller than the reference angle (θa), the microprocessor 13 (switching condition determination unit 72f) determines whether or not a teammate player object (except the goal keeper) of the update target object is located in the vicinity of the straight line 60 from the position (T) of the marking target player object (a player object 46 marked by the update target object) to the representative point (G) of the goal object 44 of the team to which the update target object belongs (S305). For example, for each of the teammate player objects (except the goal keeper) of the update target object, whether or not the length (L) of a normal from the position (F) of the teammate player object to the straight line 60 is equal to or shorter than a predetermined reference distance (La) is determined. That is, whether or not any teammate player object (except the goal keeper) of the update target object is located in an area 84 within a distance from the straight line 60, equal to or shorter than the predetermined reference distance (La) is determined. When it is determined that the length (L) of the normal from the position (F) of any teammate player object to the straight line 60 is equal to or shorter than the predetermined reference distance (La), it is determined that the teammate player object of the update target object is located in the vicinity of the straight line 60.

When no teammate player object of the update target object is located in the vicinity of the above described straight line 60, the microprocessor 13 (marker control switching unit 72g) sets the marker action mode of the update target object to the "normal mode" (S307). Meanwhile, when any teammate player object of the update target object is located in the vicinity of the straight line 60, the microprocessor 13 (marker control switching unit 72g) updates the marker action mode flag of the update target object to set the marker action mode of the update target object to the "intercept mode" (S306).

After the process at S306 or S307, the microprocessor 13 determines whether or not there is any player object 46, among the player objects 46 belonging to the team of a user having pressed the switching instruction button, for which a marker action mode update process (S302 to S307) has not yet been carried out (S308). When there is such a player object 46, the microprocessor 13 selects any of such player objects 46 as a new update target object (S309), and carries out the marker action mode update process (S302 to S307) relative to the update target object. Meanwhile, when there is no such player object 46, the process at S207 in FIG. 12 is carried out.

A case in which it is determined at S304 in FIG. 14 that the angle (θ) is equal to or smaller than the reference angle (θa) refers to a case in which the ball holding player object is directed to a marking target player object and highly likely to make a pass to the marking target player object. This is considered a case appropriate for setting the action mode of the marker player object to the "intercept mode". According to the process shown in FIG. 14, only when the ball holding player object is highly likely to make a pass to the marking target player object, the action mode of the marker player object is switched from the "normal mode" to the "intercept mode". That is, in a case where a ball holding player object is unlikely to make a pass to the marking target player object, switching of the action mode of the marker player object from the "normal mode" to the "intercept mode" is restricted.

Figure 17:
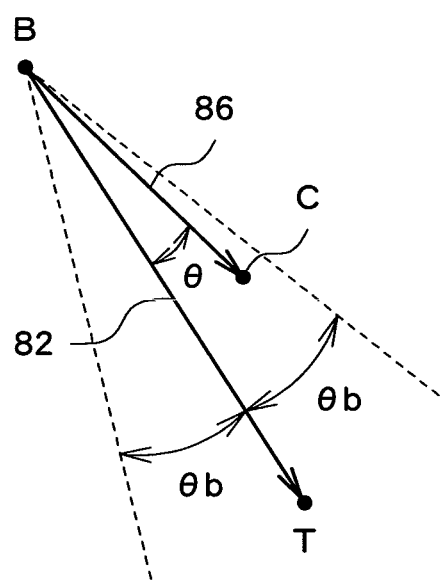
FIG. 17 is a diagram showing one example of a switching condition.

Note that at S304 in FIG. 14 the microprocessor 13 may determine whether or not a predetermined condition concerning the position of the cursor of a user operating the ball holding player object and the position of the marking target player object is satisfied. FIG. 17 is a diagram explaining one example of the predetermined condition. For example, as shown in FIG. 17, the microprocessor 13 may determine whether or not the angle (θ) between the direction 86 from the position (B) of the ball holding player object (or the ball object 48) to the position (C) of the cursor of a user operating the ball holding player object and the direction 82 from the position (B) of the ball holding player object to the position (T) of the marking target player object is equal to or smaller than a predetermined reference angle (θb). In the above, the position (C) of the cursor is a position in the virtual three dimensional space, corresponding to the display position of the cursor. Alternatively, the microprocessor 13 may determine whether or not the distance between the position (C) of the cursor of a user operating the ball holding player object and the position (T) of the marking target player object is equal to or shorter than a predetermined reference distance. Also in the above, only when the ball holding player object is highly likely to make a pass to the marking target player object, the action mode of the marker player object is switched from the "normal mode" to the "intercept mode".

A case in which it is determined at S305 in FIG. 14 that the position (F) of a teammate player object of the update target object is located in the vicinity of the straight line 60 from the position (T) of the marking target player object to the representative point (G) of the goal object 44 of the team to which the update target object belongs refers to a case in which a teammate player object of the marker player object can defend against the marking target player object about to move toward the goal object 44. That is, that is a case in which it is ensured that the marking target player object cannot move freely even if a through-pass from the ball holding player object to the marking target player object is successfully made. This situation is considered appropriate for setting the action mode of the marker player object to the "intercept mode". Through the process shown in FIG. 14, only when a teammate player object of a marker player object can defend against a marking target player object about to move toward the goal object 44, switching of the action mode of the marker player object from the "normal mode" to the "intercept mode" is effected. That is, in the case where a teammate player object of a marker player object cannot defend against a marking target player object about to move toward the goal object 44, switching of the action mode of the marker player object from the "normal mode" to the "intercept mode" is restricted.

Note that the position of a marker player object may be used in S305 in FIG. 14 instead of the position of a marking target player object. That is, the microprocessor 13 may determine whether or not a teammate player object of the update target object is located in the vicinity of the straight line from the position (M) of the update target object (marker player object) to the representative point (G) of the goal object 44 of the team to which the update target object belongs. In the above as well, only when a teammate player object of a marker player object can defend against a marking target player object about to move toward the goal object 44, switching of the action mode of the marker player object from the "normal mode" to the "intercept mode" is effected.

In the process shown in FIGS. 12 and 13, in response to the switching instruction button being pressed by a user, the action modes of all of the marker player objects belonging to the user team are switched from the "normal mode" to the "intercept mode" or vice versa. On the contrary, in the process shown in FIG. 14, for example, only in a case appropriate for setting the action mode of a marker player object to the "intercept mode", switching of the action mode from the "normal mode" to the "intercept mode" is effected, and in a case not appropriate for setting the action mode of a marker player object to the "intercept mode", switching from the "normal mode" to the "intercept mode" is restricted.

Note that the process at S205 in FIG. 12 may be omitted so that the process at S301 in FIG. 14 may be carried out after the process at S204 in FIG. 12. With the above, the action mode of a marker player object is switched from the "normal mode" to the "intercept mode" without a user pressing the switching instruction button, when it is appropriate for setting the action mode of a marker player object to the "intercept mode". As a result, the user can concentrate on defense against a ball holding player object, so that operability for a user when a player object 46 belonging to the opponent team holds the ball object 48 can be improved.

Also, e.g., at a time considered appropriate for switching the marker action mode, an image (e.g., an icon image) for informing a user of the arrival of such a time may be shown in the game screen image 50.

For example, at a time with the angle (θ) between the representative direction 80 of the ball holding player object and the direction 82 from the position (B) of the ball holding player object to the position (T) of the marking target player object being equal to or smaller than the predetermined reference angle (θa), as shown in FIG. 15, a predetermined icon image may be shown in the game screen image 50.

Also, for example, as shown in FIG. 17, at a time when the angle (θ) between the direction 86 from the position (B) of the ball holding player object (or the ball object 48) to the position (C) of the cursor of a user operating the ball holding player object and the direction 82 from the position (B) of the ball holding player object (or the ball object 48) to the position (T) of the marking target player object is equal to or smaller than a predetermined reference angle (θb), a predetermined icon image may be shown in the game screen image 50.

Also, for example, at a time when the distance from the position (C) of the cursor of a user operating the ball holding player object to the position (T) of the marking target player object is equal to or shorter than a predetermined reference distance, a predetermined icon image may be shown in the game screen image 50.

Also, for example, at a time when the position (F) of a teammate player object (except the goal keeper) of a marker player object is located in an area (for example, the area 84 shown in FIG. 16) specified based on the position (T) of a marking target player object and the representative point (G) of the goal object 44 of the team to which the marker player object belongs, a predetermined icon image may be shown in the game screen image 50. Also, for example, at a time when the position (F) of a teammate player object (except the goal keeper) of a marker player object is located in an area specified based on the position (M) of the marker player object and the representative point (G) of the goal object 44 of the team to which the marker player object belongs, a predetermined icon image may be shown in the game screen image 50.

With the above, a user can recognize a time appropriate for switching the marker action mode. That is, a user can recognize a time at which to press the switching instruction button.

Also, for example, although it is described in the above that the first marker control unit 72*d* controls the position of a marker player object, based on the position of a marking target player object and the representative point (predetermined position) of the goal object 44 of the team to which the marker player object belongs, the first marker control unit 72*d* may use another predetermined position, instead of the representative point of the goal object 44 of the team to which the marker player object belongs. For example, as a "predetermined position", a position on the goal line 43 on the side with the goal object 44 of the team to which the marker player object belongs may be used. Alternatively, as a "predetermined position", a representative point of or a position in the vicinity of the corner area 47 on the side with the goal object 44 of the team to which the marker player object belongs may be used. With the above, in the "normal mode", a marker player object may try to prevent a marking target player object from moving to a position in the vicinity of the goal line 43 (corner area 47) and making a cross pass.

Note that, in this case, a "predetermined position" may change based on the position of a marking target player object. For example, a candidate for a "predetermined position" may be stored so as to be correlated to a position condition concerning the position of a marking target player object, so that the first marker control unit 72*d* may control the position of a marker player object, based on the position of a marking target player object and a "predetermined position" corresponding to a position condition satisfied by the position of the marking target player object. For example, as a "predetermined position" corresponding to an area in the vicinity of the touch line 45, a representative point of the corner area 47 related to the touch line 45 is set. Also, for example, as a "predetermined position" corresponding to an area other than an area in the vicinity of the touch line 45, a representative point of the goal object 44 is set. As described above, when a marking target player object is located in the vicinity of the touch line 45 in the "normal mode", the marker player object may try to prevent the marking target player object from moving to a position in the vicinity of the corner area 47 and making a cross pass. Meanwhile, when a marking target player object is not located in the vicinity of the touch line 45, the marker player object may try to prevent the marking target player object from receiving a pass from a ball holding player object and pushing toward the goal object 44.

Also, for example, a game to be carried out in the game device 10 is not limited to a game in which a three dimensional game space formed using three coordinate elements is displayed as a game screen image 50. A game to be carried out in the game device 10 may be a game in which a two dimensional game space formed using two coordinate elements is displayed in a game screen image 50. That is, a game to be carried out in the game device 10 may be a game in which the positions, and the like, of a ball character and a player character are managed using two coordinate elements.

Also, for example, the opponent team may be operated by the microprocessor 13. Also, for example, a game to be carried out in the game device 10 may be a game to be played by two or more users. Also, for example, a game to be carried out in the game device 10 is not limited to a soccer game. A game to be carried out in the game device 10 may be a sport game other than a soccer game. For example, the present invention can be applied to a sport game to be played using a moving object, such as a ball, a puck, or the like.

Also, for example, the operation input unit 21 may be a touch panel, a mouse, or the like.

Also, for example, the cursors 56a, 56b may move according to an operation of the direction button 36. Also, for example, the movement direction and kick direction of an instruction target player object 46 may be directly designated by a user by operating the direction button 36. In this case, displaying of the cursors 56a, 56b can be omitted.

Also, for example, objects representative of the cursors 56a and 56b may be placed in the virtual three dimensional space 40 so that the cursors 56a and 56b are shown in the game screen image 50.

Figure 18:
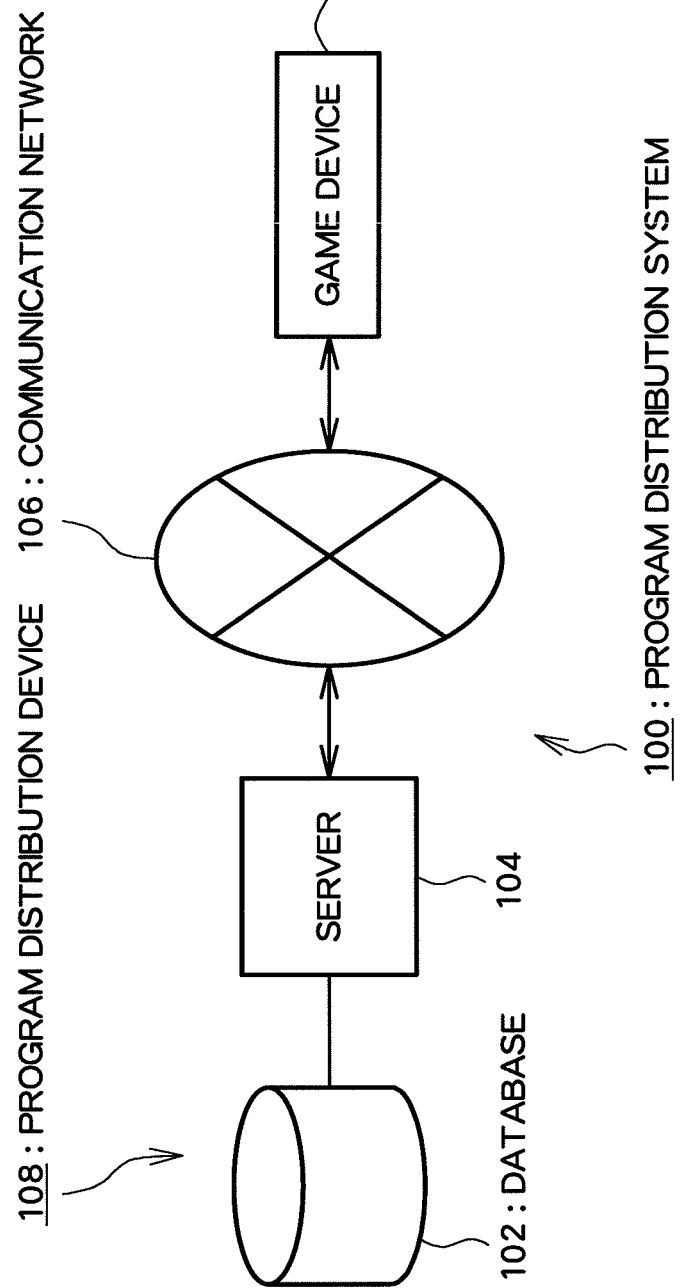
FIG. 18 is a diagram showing a complete structure of a program distribution system according to another embodiment of the present invention.

Also, for example, although a program is supplied via the optical disk 32, or an information storage medium, to the game device 10 in the above description, a program may be distributed through a communication network to the game device 10. FIG. 18 is a diagram showing a complete structure of a program distribution system using a communication network. A program distribution method according to the present invention will be described based on FIG. 18. As shown in FIG. 18, the program distribution system 100 comprises a game device 10, a communication network 106, and a program distribution device 108. The communication network 106 includes, for example, the Internet and/or a cable television network. The program distribution device 108 comprises a game database 102 and a server 104. In the system, a program similar to that which is stored in the optical disk 32 is stored in the game database (an information storage medium) 102. When a demander requests game distribution, using the game device 10, the request is sent through the communication network 106 to the server 104. In response to the game distribution request, the server 104 reads the program from the game database 102, and sends the read program to the game device 10. Note that although game distribution is made in response to a game distribution request in the above, the server 104 may send a program one-sidedly. In addition, it is not always necessary to distribute all programs necessary to realize a game at the same time (collective distribution), and distribution of only a portion necessary depending on an aspect of a game may be applicable (dividing distribution). Game distribution through the communication network 106, as described above, makes it easier for a demander to obtain a program.

The invention claimed is:

1. A game device for carrying out a sport game to be played by a user team and an opponent team, comprising:
   player character state storage means for storing positions of player characters belonging to the user team and positions of player characters belonging to the opponent team;
   marking target selection means for selecting a player character who is different from another player character who is holding a moving object among player characters belonging to the opponent team as a marking target player character;
   marker selection means for selecting any of the player characters belonging to the user team as a marker player character;
   first marker control means for controlling a position of the marker player character to be in a first mode, based on a position of the marking target player character and a predetermined position, such that the position of the marker player character is between the marking target player character and the predetermined position;
   second marker control means for controlling, in a case where a player character that is belonging to the opponent team and other than the marking target player holds the moving object, the position of the marker player character to be in a second mode, based on both the position of the marking target player character and a position of the moving object or a position of the player character holding the moving object among the player characters belonging to the opponent team such that the position of the marker player character is between the marking target player character and the position of the moving object or the position of the player character holding the moving object;
   determination means for determining whether or not a predetermined switching condition is satisfied; and
   marker control switching means for switching, in the case where the player character that is belonging to the opponent team and other than the marking target player holds the moving object, a state in which the first marker control means controls the position of the marker player character and a state in which the second marker control means controls the position of the marker player character, based on a result of determination by the determination means.

2. The game device according to claim 1, wherein
   the player character state storage means stores a representative direction of the player character belonging to the opponent team,
   the switching condition includes a condition for determining whether or not an angle between the representative direction of the player character holding the moving object among the player characters belonging to the opponent team and a direction from the position of the player character holding the moving object among the player characters belonging to the opponent team to the position of the marking target player character is equal to or smaller than a predetermined reference angle, and
   the marker control switching means includes a means for switching, in a case where the angle is equal to or smaller than the predetermined reference angle, from the state in which the first marker control means controls the position of the marker player character to the state in which the second marker control means controls the position of the marker player character.

3. The game device according to claim 1, wherein
   the opponent team is operated by an opponent user,
   the game device further comprises means for displaying a cursor which moves according to an operation by the opponent user in a game screen image, and means for, in a case where the opponent user carries out a predetermined pass instruction operation, causing the player character holding the moving object, among the player characters belonging to the opponent team, to make a pass toward a position of the cursor, and the switching condition includes a condition concerning the position of the cursor and the position of the marking target player character.

4. The game device according to claim 3, wherein
the switching condition includes a condition for determining whether or not an angle between a direction from the position of the moving object or the position of the player character holding the moving object, among the player characters belonging to the opponent team, to the position of the cursor and a direction from the position of the moving object or the position of the player character holding the moving object, among the player characters belonging to the opponent team, to the position of the marking target player character is equal to or smaller than a predetermined reference angle, and the marker control switching means includes a means for, in a case where the angle is equal to or smaller than the predetermined reference angle, switching from the state in which the first marker control means controls the position of the marker player character to the state in which the second marker control means controls the position of the marker player character.

5. The game device according to claim 3, wherein
the switching condition includes a condition for determining whether or not a distance between the position of the cursor and the position of the marking target player character is equal to or shorter than a predetermined reference distance, and the marker control switching means includes a means for, in a case where the distance is equal to or shorter than the predetermined reference distance, switching from the state in which the first marker control means controls the position of the marker player character to the state in which the second marker control means controls the position of the marker player character.

6. The game device according to claim 1, wherein
the switching condition is a condition for determining whether or not a player character other than the marker player character, among the player characters belonging to the user team, is located within an area specified based on the position of the marking target player character and the predetermined position, and the marker control switching means includes means for, in a case where the player character other than the marker player character, among the player characters belonging to the user team, is located within the area, switching from the state in which the first marker control means controls the position of the marker player character to the state in which the second marker control means controls the position of the marker player character.

7. The game device according to claim 1, wherein
the switching condition is a condition for determining whether or not a player character other than the marker player character, among the player characters belonging to the user team, is located within an area specified based on the position of the marker player character and the predetermined position, and the marker control switching means includes means for, in a case where the player character other than the marker player character, among the player characters belonging to the user team, is located within the area, switching from the state in which the first marker control means controls the position of the marker player character to the state in which the second marker control means controls the position of the marker player character.

8. The game device according to claim 1, wherein
the determination means determines whether or not a predetermined switching instruction operation is carried out, the marker control switching means, in a case where the predetermined switching instruction operation is carried out, switches the state in which the first marker control means controls the position of the marker player character and the state in which the second marker control means controls the position of the marker player character, and the game device further comprises second determination means for determining whether or not a condition concerning at least one of the position of the marker player character and the position of the marking target player character is satisfied, and means for displaying a predetermined image in the game screen image, based on a result of determination by the second determination means.

9. The game device of claim 1, wherein the state in which the first marker control unit controls the position of the marker player character is a normal mode in which the marker player character tries to prevent the marking target player character from receiving a pass from the player character holding the moving object and pushing toward a goal object.

10. The game device of claim 1, wherein the state in which the second marker control unit controls the position of the marker player character is an intercept mode in which the marker player character tries to intercept a pass from the player character holding the moving object to the marking target player character.

11. The game device of claim 1, wherein the marking target player character is selected when the another player character is holding the moving object.

12. The game device of claim 1, wherein the marker control switching means switches between the first mode and the second mode based on an angle between a representative direction of the player character who is holding the moving object and a direction from the player character who is holding the moving object to the marking target player character.

13. A game device control method for controlling a game device for carrying out a sport game to be played by a user team and an opponent team, the method comprising:

reading content stored in player character state storage unit for storing positions of player characters belonging to the user team and positions of player characters belonging to the opponent team;

selecting a player character who is different from another player character who is holding a moving object among the player characters belonging to the opponent team as a marking target player character;

selecting any of the player characters belonging to the user team as a marker player character;

a first marker control operation of controlling a position of the marker player character to be in a first mode, based on a position of the marking target player character and a predetermined position, such that the position of the marker player character is between the marking target player character and the predetermined position;

a second marker control operation of controlling, in a case where a player character that is belonging to the opponent team and other than the marking target player holds the moving object, the position of the marker player character to be in a second mode, based on both the position of the marking target player character and a position of the moving object or a position of the player character holding the moving object, among the player characters belonging to the opponent team, such that the position of the marker player character is between the marking target player character and the position of the moving object or the position of the player character holding the moving object;

determining, by a processor, whether or not a predetermined switching condition is satisfied; and switching, in the case where the player character that is belonging to the opponent team and other than the marking target player holds the moving object, a state in which the position of the marker player character is controlled at the first marker control operation and a state in which the position of the marker player character is controlled at the second marker control operation, based on a result of the determining whether or not the predetermined switching condition is satisfied.

14. A non-transitory computer readable information storage medium storing a program for causing a computer to function as a game device for carrying out a sport game to be played by a user team and an opponent team, the program for causing the computer to function as:

player character state storage means for storing positions of player characters belonging to the user team and positions of player characters belonging to the opponent team;

marking target selection means for selecting a player character who is different from another player character who is holding a moving object among the player characters belonging to the opponent team as a marking target player character;

marker selection means for selecting any of the player characters belonging to the user team as a marker player character;

first marker control means for controlling a position of the marker player character to be in a first mode, based on a position of the marking target player character and a predetermined position, such that the position of the marker player character is between the marking target player character and the predetermined position;

second marker control means for controlling, in a case where the player character that is belonging to the opponent team and other than the marking target player holds the moving object, the position of the marker player character to be in a second mode, based on both the position of the marking target player character and a position of the moving object or a position of the player character holding the moving object, among the player characters belonging to the opponent team, such that the position of the marker player character is between the marking target player character and the position of the moving object or the position of the player character holding the moving object;

determination means for determining whether or not a predetermined switching condition is satisfied; and marker control switching means for switching, in the case where the player character that is belonging to the opponent team and other than the marking target player holds the moving object, a state in which the first marker control means controls the position of the marker player character and a state in which the second marker control means controls the position of the marker player character, based on a result of determination by the determination means.

15. A game device for carrying out a sport game to be played by a user team and an opponent team, comprising:

player character state storage unit which stores positions of player characters belonging to the user team and positions of player characters belonging to the opponent team;

marking target selection unit configured to select any of the player characters belonging to the opponent team as a marking target player character;

marker selection unit configured to select a player character who is different from another player character who is holding a moving object among the player characters belonging to the user team as a marker player character;

first marker control unit configured to control a position of the marker player character to be in a first mode, based on a position of the marking target player character and a predetermined position, such that the position of the marker player character is between the marking target player character and the predetermined position;

second marker control unit configured to control, in a case where a player character that is belonging to the opponent team and other than the marking target player holds the moving object, the position of the marker player character to be in a second mode, based on both the position of the marking target player character and a position of the moving object or a position of the player character holding the moving object among the player characters belonging to the opponent team, such that the position of the marker player character is between the marking target player character and the position of the moving object or the position of the player character holding the moving object;

determination unit, implemented by a processor, configured to determine whether or not a predetermined switching condition is satisfied; and marker control switching unit configured to switch, in the case where the player character that is belonging to the opponent team and other than the marking target player holds the moving object, a state in which the first marker control unit controls the position of the marker player character and a state in which the second marker control unit controls the position of the marker player character, based on a result of determination by the determination unit.

* * * * *